United States Patent

Shimoura et al.

[11] Patent Number: 5,850,193
[45] Date of Patent: Dec. 15, 1998

[54] APPARATUS FOR ASSISTING DRIVER IN CAREFULLY DRIVING

[75] Inventors: Hiroshi Shimoura; Kenji Tenmoku, both of Osaka, Japan

[73] Assignee: Sumitomo Electric Industries, Ltd., Osaka, Japan

[21] Appl. No.: 582,395

[22] Filed: Jan. 3, 1996

[30] Foreign Application Priority Data

Mar. 30, 1995 [JP] Japan .................................. 7-073311

[51] Int. Cl.⁶ .................................................. G08G 1/123
[52] U.S. Cl. ........................ 340/995; 340/439; 340/576; 340/988; 701/210
[58] Field of Search ..................................... 340/995, 575, 340/576, 439, 460, 988, 990; 701/209, 210

[56] References Cited

U.S. PATENT DOCUMENTS

| | | | |
|---|---|---|---|
| 4,389,639 | 6/1983 | Torii et al. | 340/460 |
| 4,581,607 | 4/1986 | Seko et al. | 340/576 |
| 5,243,528 | 9/1993 | Lefebvre | 340/990 |
| 5,262,775 | 11/1993 | Tamai et al. | 340/995 |
| 5,315,295 | 5/1994 | Fujii | 340/936 |
| 5,319,561 | 6/1994 | Matsuzaki | 340/995 |
| 5,465,079 | 11/1995 | Bouchard et al. | 340/576 |
| 5,488,353 | 1/1996 | Kawakami et al. | 340/576 |
| 5,521,580 | 5/1996 | Kaneko et al. | 340/439 |
| 5,550,538 | 8/1996 | Fujii et al. | 340/995 |
| 5,570,087 | 10/1996 | Lemelson | 340/576 |

FOREIGN PATENT DOCUMENTS

| | | |
|---|---|---|
| 0061501 | 4/1982 | European Pat. Off. . |
| 4324215 | 1/1994 | Germany . |
| 2276452 | 9/1994 | United Kingdom . |

*Primary Examiner*—Brent A. Swarthout
*Attorney, Agent, or Firm*—Lane, Aitken & McCann

[57] ABSTRACT

Herein disclosed is an apparatus mounted on a vehicle for assisting a vehicle driver in carefully driving. The apparatus comprises data obtaining means for obtaining vehicle movement data indicative of a movement of the vehicle, estimating means for estimating a current location of the vehicle on the basis of the vehicle movement data obtained by the data obtaining means, information providing means for providing the vehicle driver with guide information as to the current location of the vehicle estimated by the estimating means, and judging means for judging whether travel of the vehicle is anomalous or not, on the basis of the vehicle movement data obtained by the obtaining means. The information providing means is operated to provide the vehicle driver with attention information that the travel of the vehicle is anomalous when the judging means judges that the travel of the vehicle is anomalous. The apparatus thus constructed serves not only as navigation apparatus but also as a anomalous travel preventing apparatus.

13 Claims, 15 Drawing Sheets

FIG.2

ROUTE NETWORK TABLE

| ADD | LINK DATA | | | | | | | ARC DATA | | | | | | | | |
|---|---|---|---|---|---|---|---|---|---|---|---|---|---|---|---|---|
| | | | | | | | | NON OPTION | | | | | NON USE OF EXPRESSWAY | | | |
| | LN | LL | RT | SPC | EPC | NS | | EXIT LINK 1 | | EXIT LINK 2 | | ...... | EXIT LINK 1 | | EXIT LINK 2 | | ...... |
| | | | | | | | | ARC COST | POINTER | ARC COST | POINTER | | ARC COST | POINTER | ARC COST | POINTER |
| 0 | 1 | | | | | | | | | | | | | | | |
| 1 | 3 | | | | | | | | | | | | | | | |
| 2 | 5 | | | | | | | | | | | | | | | |
| 3 | 6 | | | | | | | | | | | | | | | |
| 4 | 8 | | | | | | | | | | | | | | | |
| ...... | ...... | | | | | | | | | | | | | | | |

ADD : ADDRESS
LN  : LINK NUMBER
LL  : LINK LENGTH
RT  : ROAD TYPE
SPC : STARTING POINT COORDINATE
EPC : END POINT COORDINATE
NS  : NODE SHAPE

FIG.11

| MEANDERING | SIDE WARD DEFLECTION | RELATIVE VELOCITY | APPROACH |
|---|---|---|---|
| 1 | 0 | 1 | 0 |

APPARATUS FOR ASSISTING DRIVER IN CAREFULLY DRIVING

BACKGROUND OF THE INVENTION

1. Field of the Invention

The present invention relates to an apparatus mounted on a vehicle for assisting a vehicle driver in carefully driving.

2. Description of the Related Art

There have so far been proposed a wide variety of navigation apparatus which inform the vehicle driver of not only the current location of the vehicle but also an optimum travel route which extends from the current location of the vehicle to a destination specified by the vehicle driver. In order to estimate the current location of the vehicle, the navigation apparatus employs a so-called "dead reckoning method" in which the location of the vehicle is detected by heading and distance sensors mounted on the vehicle. The heading sensor is adapted to detect a heading of the vehicle, while the distance sensor is adapted to detect a travel distance of the vehicle. The dead reckoning method is in no need of external assisting facilities such as beacons and satellites. However, the heading and distance sensors entail errors in response to increase of the travel distance of the vehicle, thereby causing the errors of the location detection to be accumulated.

In order to reduce such accumulated errors of the location detection, the navigation apparatus employs a so-called "map matching algorithm" in which the current location of the vehicle is estimated by matching the patterns between a pattern of the travel route derived from the heading and distance sensors and a road pattern derived from a road map data base. Recently, the navigation apparatus further employs a "global positioning system" (hereinlater simply referred to as "GPS") for detecting the absolute position of the vehicle so as to correct the vehicle location derived by the foregoing map matching algorithm on the basis of the absolute position derived from the GPS, thereby enhancing the accuracy of the map matching algorithm. The GPS is a system for detecting an absolute position on the basis of radio waves transmitted from man-made satellites (hereinlater simply referred to as "GPS satellites"). More specifically, the radio waves are transmitted from three or more GPS satellites revolving around their predetermined orbits to a GPS receiver mounted on the vehicle. The GPS receiver is designed to decode pseudonoise codes received from the three or four GPS satellites for calculating a two-dimensional or three-dimensional absolute location of the vehicle on the earth.

The navigation apparatus thus constructed is operated to display a road map including the current location of the vehicle and the destination and guide the vehicle driver to the destination. If an operator such as a vehicle driver or a passenger operates the navigation apparatus and designates a starting point, a transit point, and a destination, the navigation apparatus calculates a plurality of candidate routes between the starting point and the destination, and a plurality of indicators of a route selection. The indicators comprise, for example, a distance between the starting point and the destination, and a time required in a travel between the starting point and the destination. The navigation apparatus selects and displays the most recommendable one of the candidate routes with reference to the indicators. If the vehicle approaches an intersection, a navigation apparatus recently proposed informs the vehicle driver of a road included in the most recommendable route, i.e., instructs the vehicle driver to turn, for instance, to the left.

There has also been proposed a wide variety of anomalous travel preventing apparatus which prevent the travel of the vehicle from becoming anomalous. The anomalous travel of the vehicle results, for example, from a drowsiness which comes over the vehicle driver.

In this case, the anomalous travel preventing apparatus serves as a drowsiness preventing apparatus. When the drowsiness preventing apparatus detects one of indications that a travel locus of the vehicle is anomalous and that the vehicle extremely approaches an obstruction such as a preceding vehicle, the drowsiness preventing apparatus recognizes that a drowsiness comes over the vehicle driver. The former drowsiness detecting method is disclosed, for instance, in Japanese Patent Laid-open Publication Nos. 60-157927, 1-83423 and 569757. The drowsiness detecting method disclosed in the Japanese Patent Laid-open Publication No. 60-157927 comprises steps of obtaining a rotation angle signal representative of a rotation angle of a steering, analyzing the rotational signal, and recognizing the travel of the vehicle to be anomalous when high-frequency components are detected at the analyzing step. The drowsiness detection method disclosed in the Japanese Patent Laid-open Publication No. 1-83423 comprises steps of detecting lines drawn on a road so as to defining traffic lanes, and recognizing that the vehicle is moving in a zigzag direction when the vehicle frequency crosses the lines. The drowsiness detection method disclosed in the Japanese Patent Laid-open Publication No. 5-69757 comprises steps of detecting sideward deflection of the vehicle with respect to a position suitable for travel on a traffic lane, and recognizing the anomalous travel of the vehicle when the sideward deflection exceeds a predetermined deflection level.

If both the former prior-art navigation apparatus and the latter prior-art anomalous travel preventing apparatus are mounted on a vehicle, a drawback is encountered in that the vehicle is provided with numerous sensors, calculating devices, and informing devices for guiding the vehicle driver to the destination and preventing the anomalous travel of the vehicle. Another drawback is encountered in that the vehicle driver is confused by a lot of disorderly information and instructions provided for the vehicle driver because of the fact that the navigation apparatus and the anomalous travel preventing apparatus are operated independently of each other.

If only the latter prior-art anomalous travel preventing apparatus is mounted on a vehicle, a drawback is encountered in that mistaken information and instructions is frequently provided for the vehicle driver for the following reason. The prior-art anomalous travel preventing apparatus recognize the travel of the vehicle to be anomalous whenever the anomalous travel preventing apparatus detects one of indications of the anomalous travel of the vehicle. If there is a road improvement in a road on which the vehicle is traveling, the road improvement might urge the vehicle to travel in a zigzag direction or to frequently crosses lines drawn on the road. In this instance, there is a strong possibility that the anomalous travel preventing apparatus mistakenly recognizes the travel of the vehicle to be anomalous and accordingly gives an unnecessary caution to the vehicle driver by an alarm such as beep. In addition, the anomalous travel preventing apparatus mistakenly recognizes the travel of the vehicle to be anomalous if the vehicle meets traffic congestion. This can be understood because of the fact that the vehicle frequently approach the preceding vehicle in the extreme under the traffic congestion. If the vehicle driver feels the alarm to be useless and offensive to the ear, the anomalous travel preventing apparatus might be halted by the vehicle driver.

SUMMARY OF THE INVENTION

It is an object of the present invention to provide a driver assisting apparatus serving as a navigation apparatus and as a anomalous travel preventing apparatus.

It is another object of the present invention to provide a driver assisting apparatus detecting the anomalous travel of the vehicle with accuracy.

It is a further object of the present invention to provide a driver assisting apparatus reducing driver's irritation due to mistaken detection of the anomalous travel.

According to one aspect of the present invention there is provided an apparatus mounted on a vehicle for assisting a vehicle driver in carefully driving, comprising data obtaining means for obtaining vehicle movement data indicative of a movement of the vehicle, estimating means for estimating a current location of the vehicle on the basis of the vehicle movement data obtained by the data obtaining means, information providing means for providing the vehicle driver with guide information as to the current location of the vehicle estimated by the estimating means, and judging means for judging whether travel of the vehicle is anomalous or not, on the basis of the vehicle movement data obtained by the obtaining means. The information providing means is operated to provide the vehicle driver with attention information that the travel of the vehicle is anomalous when the judging means judges that the travel of the vehicle is anomalous. The travel of the vehicle is considered anomalous when the action of the vehicle is unstable.

According to another aspect of the present invention there is provided an apparatus mounted on a vehicle for assisting a vehicle driver in carefully driving, comprising data obtaining means for obtaining vehicle movement data indicative of a movement of the vehicle, estimating means for estimating a current location of the vehicle on the basis of the vehicle movement data obtained by the data obtaining means, information providing means for providing the vehicle driver with guide information as to the current location of the vehicle estimated by the estimating means, judging means for judging whether travel of the vehicle is anomalous or not, on the basis of the vehicle movement data obtained by the obtaining means, and information producing means for producing facility information as to facilities effective in causing the vehicle to recover from the anomalous travel when the judging means judges that the travel of the vehicle is anomalous. The information providing means is operated to further provide the vehicle driver with the facility information to guide the vehicle driver to the facilities.

According to a further aspect of the present invention there is provided an apparatus mounted on a vehicle for assisting a vehicle driver in carefully driving, comprising data obtaining means for obtaining vehicle movement data indicative of a movement of the vehicle, estimating means for estimating a current location of the vehicle on the basis of the vehicle movement data obtained by the data obtaining means, information providing means for providing the vehicle driver with guide information as to the current location of the vehicle estimated by the estimating means, judging means for judging whether travel of the vehicle is anomalous or not, on the basis of the vehicle movement data obtained by the obtaining means, information producing means for producing expressway exit information as to an expressway exit of the expressway closest to the current location of the vehicle when the vehicle is traveling on the expressway and when the judging means judges that the travel of the vehicle is anomalous. The information providing means is operated to provide the vehicle driver with the expressway exit information produced by the information producing means.

According to a yet further aspect of the present invention there is provided an apparatus mounted on a vehicle for assisting a vehicle driver in carefully driving, comprising data obtaining means for obtaining vehicle movement data indicative of a movement of the vehicle, estimating means for estimating a current location of the vehicle on the basis of the vehicle movement data obtained by the data obtaining means, information providing means for providing the vehicle driver with guide information as to the current location of the vehicle estimated by the estimating means, judging means for judging whether travel of the vehicle is anomalous or not, on the basis of the vehicle movement data obtained by the obtaining means, information producing means for producing recommendable travel route information when the vehicle is traveling on an expressway and when the judging means judges that the travel of the vehicle is anomalous. The recommendable travel route information is about a recommendable travel route from the current location of the vehicle to a destination of the vehicle driver by way of an expressway exit of the expressway closest to the current location of the vehicle. The information providing means is operated to provide the vehicle driver with the recommendable travel route information produced by the information producing means.

According to a further aspect of the present invention there is provided an apparatus mounted on a vehicle for assisting a vehicle driver in carefully driving, comprising data producing means for producing a plurality of different vehicle movement data sets each indicative of a movement of the vehicle, judgment means for making a plurality of judgments upon whether travel of the vehicle is anomalous or not, on the basis of the vehicle movement data sets, respectively, and information providing means for providing the vehicle driver with attention information that travel of the vehicle is anomalous only when at least two judgments is affirmative.

According to a yet further aspect of the present invention there is provided an apparatus mounted on a vehicle for assisting a vehicle driver in carefully driving, comprising information providing means for providing the vehicle driver with voice information, data obtaining means for obtaining vehicle movement data indicative of a movement of the vehicle, judging means for judging whether travel of the vehicle is anomalous or not, on the basis of the vehicle movement data obtained by the obtaining means, intermittence means for intermittently stopping the information providing means from providing the voice information for the vehicle driver when the judging means judges that the travel of the vehicle is anomalous.

According to a further aspect of the present invention there is provided an apparatus mounted on a vehicle for assisting a vehicle driver in carefully driving, comprising data obtaining means for obtaining vehicle movement data indicative of a movement of the vehicle, information providing means for providing the vehicle driver with voice information, judging means for judging whether a drowsiness comes over the vehicle driver or not, on the basis of the vehicle movement data obtained by the obtaining means, music storing means for storing music effective in eliminating the drowsiness from the vehicle driver, and control means for causing the information providing means to provide the vehicle driver with the music stored in the music storing means instead of the voice information when the judging means judges that the drowsiness comes over the vehicle driver.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a view showing a route network table stored in a CD-ROM shown in FIG. 1;

FIG. 11 is a view showing in part data table stored in a microprocessor shown in FIG. 10;

DESCRIPTION OF THE PREFERRED EMBODIMENTS

A preferred first embodiment of a driver assisting apparatus according to the present invention will be hereinafter described in detail with reference concurrently to FIGS. 1 to 8.

Figure 1:
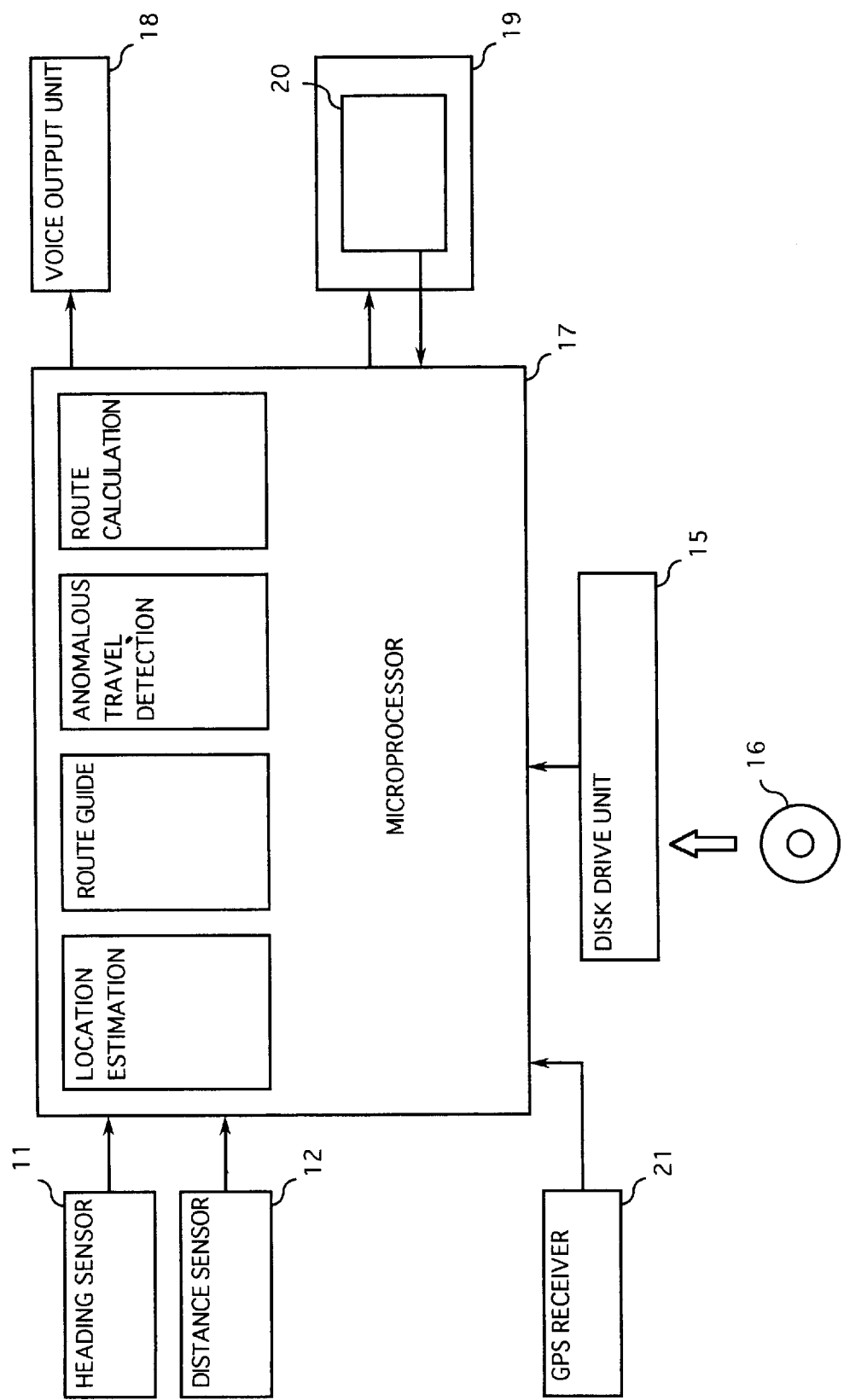
FIG. 1 is a block diagram showing a first embodiment of the driver assisting apparatus according to the present invention.

The driver assisting apparatus embodying the present invention is shown in FIG. 1 as comprising a heading sensor 11, a distance sensor 12, a GPS receiver 21, a disk drive unit 15, a CD-ROM (Compact Disc of Read Only Memory) 16, a microprocessor 17, a voice output unit 18 and a display unit 20. These devices and units are mounted on a vehicle for assisting a vehicle driver in carefully driving. The heading sensor 11 comprises a gyro for obtaining a heading of the vehicle by turning angular velocity of the vehicle. The distance sensor 12 comprises a wheel revolution speed sensor for obtaining a travel distance of the vehicle by detecting revolution speed of wheels of the vehicle. The GPS receiver 21 is designed to decode pseudo-noise codes received from three or four GPS satellites revolving around the earth for calculating an absolute current location of the vehicle on the earth.

The microprocessor 17 comprises a CPU (Central Processing Unit) for executing a wide variety of programs, a ROM (Read-only Memory) for storing the programs therein and a RAM (Random Access Memory) for temporally storing the programs loaded thereinto from the ROM and data calculated by the execution of programs. The programs includes four different main programs consisting of a location estimation program, an anomalous travel detection program, a route calculation program and a route guide program.

When the location estimation program is executed by the CPU of the microprocessor 17, a travel locus is calculated on the basis of output of the heading sensor 11 and output of the distance sensor 12 and is compared with road patterns stored in the form of road map data in the CD-ROM 16 described hereinlater in detail. Based on the results of the comparison calculation, the current location of the vehicle is estimated. The estimated current location of the vehicle is corrected with reference to the absolute current location detected by the GPS receiver 21.

When the anomalous travel detection program is executed by the CPU of the microprocessor 17, a judgment is made upon whether the travel condition of the vehicle is anomalous or not, on the basis of the output of the heading sensor 11, the distance sensor 12 and the GPS receiver 21 and/or the results of the calculations by the CPU of the microprocessor 17.

When the route calculation program is executed by the CPU of the microprocessor 17, a recommendable route is calculated on the basis of the road map data stored in the CD-ROM 16, and a starting point, a transit point and a destination designated by the vehicle driver. The recommendable route extends from the starting point to the destination by way of the transit point. If the CPU of the microprocessor 17 judges that the travel condition of the vehicle is anomalous by executing the aforementioned anomalous travel detection program, the route calculation program is executed by the CPU of the microprocessor 17 with the destination being replaced with facilities which are effective in making the vehicle recover from the anomalous travel condition. If the anomalous travel of the vehicle results from a drowsiness which comes over the vehicle driver, the facilities may be a motor court, a road house or the like which allows the vehicle driver to take a nap. In case that the vehicle is traveling on an expressway at the time when the anomalous travel of the vehicle is detected, the route calculation program is executed by the CPU of the microprocessor 17 with the transit point being set to an expressway exit closest to the current location of the vehicle.

When the route guide program is executed by the CPU of the microprocessor 17, route guide information useful to the vehicle driver is displayed as image information through the display unit 19 and provided as voice information for the vehicle driver through the voice output unit 18. The route guide information is so formed as to be useful for the vehicle driver advancing toward the destination point. If the CPU of the microprocessor 17 judges that the travel condition of the vehicle is anomalous by executing the aforementioned anomalous travel detection program, the route guide program is executed by the CPU of the microprocessor 17 to display other route guide information comprising recommendable route information as to the recommendable route between the current location of the vehicle and the facilities effective in making the vehicle recover from the anomalous travel.

The voice output unit 18 is designed to provide the vehicle driver with the route guide information and the like as voice information in accordance with instructions from the CPU of the microprocessor 17. The display unit 19 comprises a liquid crystal display unit or a cathode-ray tube (CRT) for displaying varied information on its own screen in response to instructions from the CPU of the microprocessor 17. The information comprises a management menu picture, a road map including the current location of the vehicle and a recommendable route extending from the current location of the vehicle, an arrow representative of a direction in which the vehicle ought to advance, a message represented by letters and so on. The display unit is equipped with a transparent touch panel 20 of a pressure sensitive type. The transparent touch panel 20 is designed to detect a position in which the vehicle driver touches the transparent touch panel 20, and then transmits the detected position to the CPU of the microprocessor 17. By the detected position, the CPU of the microprocessor 17 distinguish instructions which the vehicle driver gave to the driver assisting apparatus. In other words, the display unit 19 serves as an interface between the vehicle driver and the microprocessor 17.

The disk drive unit 15 is adapted to read out data from the CD-ROM 16 and transmit the read out data to the microprocessor 17 in response to instructions from the microprocessor 17. The data stored in the CD-ROM 16 is written onto a route network table shown in FIG. 2 and comprises link data and arc data. The link data is representative of links each of which corresponds to a road segment and connects two adjoining nodes indicative of intersections, corners and road ends. As shown in FIG. 2, the link data comprises link number data indicative of a link identification number assigned to each of the links, link length data indicative of the length of each of the links, road type data indicative of a road type of the link, starting point coordinate data indicative of a coordinate of a starting point of the link, ending point coordinate data indicative of a coordinate of an end point of the link, node point shape data indicative of a shape of an intersection, an corner or an road end corresponding to a node at which the link terminates. Based on the road type data, the link is recognized to be an expressway, a highway, a road, a street or the like. The node point shape data includes facility data indicative of information as to expressway exits and facilities which are effective in making the vehicle recover from the anomalous travel condition. Alternatively, the road type data may include the aforesaid facility data. The facilities mean a service area, a repair station or section, a motor court or road house allowing the vehicle driver to take a nap, and so on.

The arc data comprises a plurality of option data groups each indicative of one exit link or a plurality of exit links. The option data groups includes option data groups and a nonoption data group. One of the option data groups is representative of nonuse of expressway shown as shown in FIG. 2. The nonoption data group is selected when there is no condition for the calculation of the recommendable route. The nonoption data comprises arc cost data and pointers. The cost data is representative of the sum of a link cost and a connection cost. The link cost corresponds to a travel time between the starting point and the end point of the link, while the connection cost is representative of cost required at the time when the vehicle advances the exit link. The pointer of the nonoption data is representative of an address of the exit link. The option data group representative of nonuse of expressway is selected when there is a condition that an expressway is not utilized during the travel between the starting point or the current location of the vehicle and the destination point. It goes without saying that the option data groups differ in arc cost and pointer from one another. The route network data is not constant but variable in accordance with date (holiday such as Christmas Day, New Year's Eve and Day and the like), day of the week (Saturday and Sunday), and time of the day (rush hour) because of the fact that a traffic jam level, traffic restrictions and so on are varied with date, day of the week, and time of the day.

The driver assisting apparatus thus constructed serves as an anomalous travel preventing apparatus and a navigation apparatus. While the driver assisting apparatus serves as a navigation apparatus, the driver assisting apparatus is operated in the same manner as a conventional navigation apparatus. Therefore, a description of the operation of the driver assisting apparatus serving as a navigation is omitted herefrom.

Figure 3A:
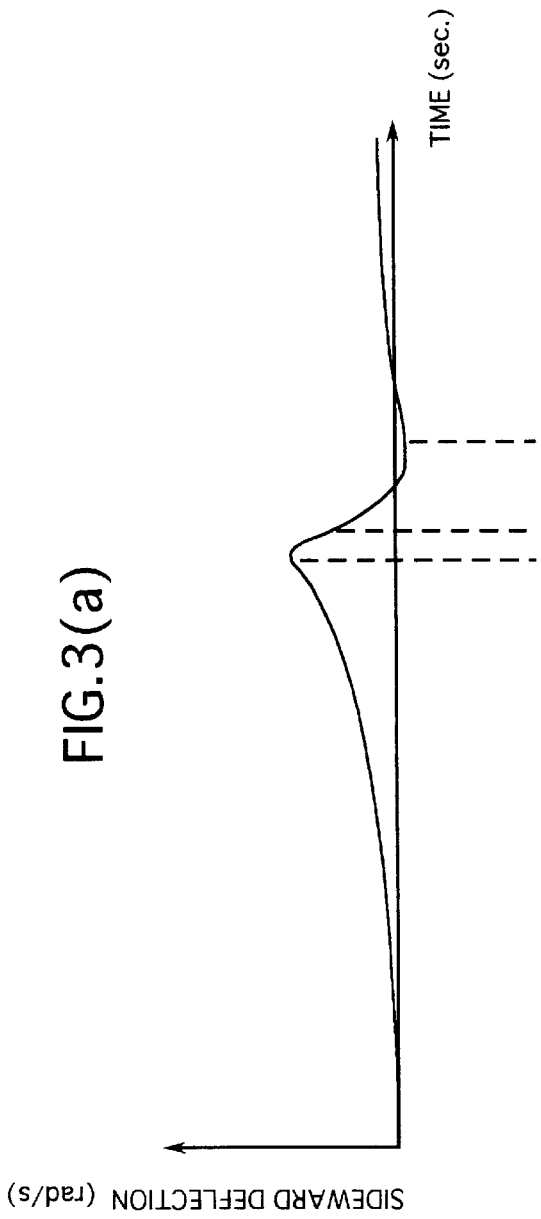
FIG. 3(a) is a graph showing a relation between sideward deflection of a vehicle and time.
Figure 3B:
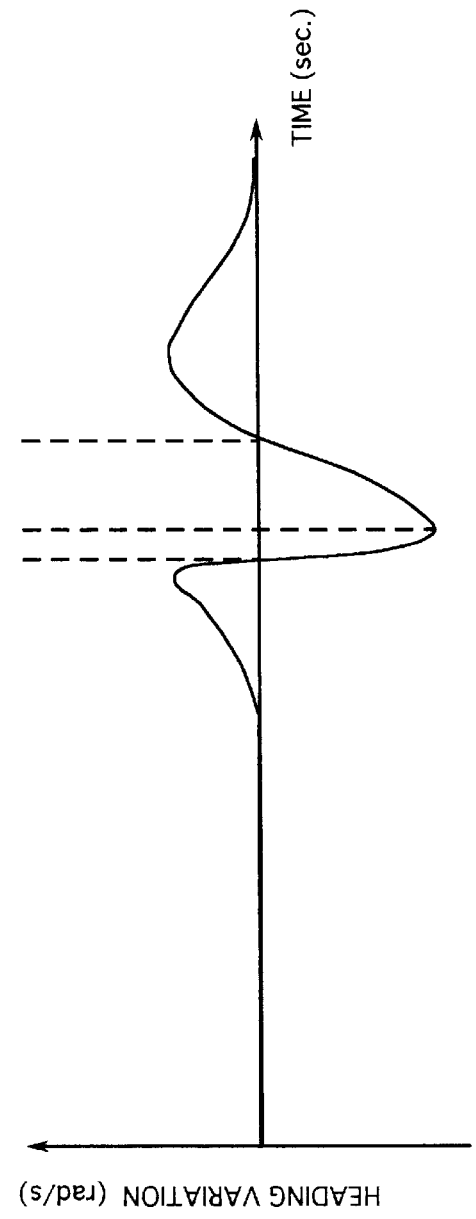
FIG. 3(b) is a graph showing a relation between heading variation of the vehicle and time.

The aforesaid anomalous travel detection program is formed on the ground of the following detection technique. In the present embodiment, the anomalous travel of the vehicle due to a drowsiness coming over the vehicle driver can be detected by executing the anomalous travel detection program. When the anomalous travel of the vehicle is thus due to the drowsiness coming over the vehicle driver, sideward deflection of the vehicle is varied with time as shown in FIG. 3(a). In this instance, a heading variation of the vehicle derived from the heading sensor 11 is varied with time as shown in FIG. 3(b). This sideward deflection and heading variation as shown in FIGS. 3(a) and 3(b) examples of unstable action of the vehicle. As will be understood from FIGS. 3(a) and 3(b), there is a strong correlation between dynamic characteristics of the sideward deflection and the heading variation of the vehicle. The dynamic characteristic of the heading variation of the vehicle shown in FIG. 3(b) can be previously sampled and stored in a storage device such as the ROM of the microprocessor 17 or the CD-ROM 16. Therefore, the anomalous travel or unstable action of the vehicle can be detected by comparing a dynamic characteristic of the heading of the vehicle derived from the heading sensor 11 during a certain period with the previously sampled and stored dynamic characteristic. The comparison of the dynamic characteristic and the detection of the anomalous travel are carried out through a pattern matching algorithm, a frequency analysis such as Fourier analysis or the like. In the present embodiment, the comparison and detection is carried out through the following technique. First, a variance value of the output of the heading sensor 11 is calculated in accordance with an equation as follows:

$$\sigma = \frac{\sum_{i=1}^{n} (Hi - A)^2}{n}$$

where $\sigma$ is the variance value of the output of the heading sensor 11, Hi is ith output of the heading sensor sampled during a certain period, n is the number of sampling during the certain period, and A is a mean of the output sampled during the certain period. If the variance value $\sigma$ exceeds a predetermined threshold value, the driver assisting apparatus judges that a drowsiness comes over the vehicle driver and accordingly that the travel of the vehicle is anomalous.

Figure 4:
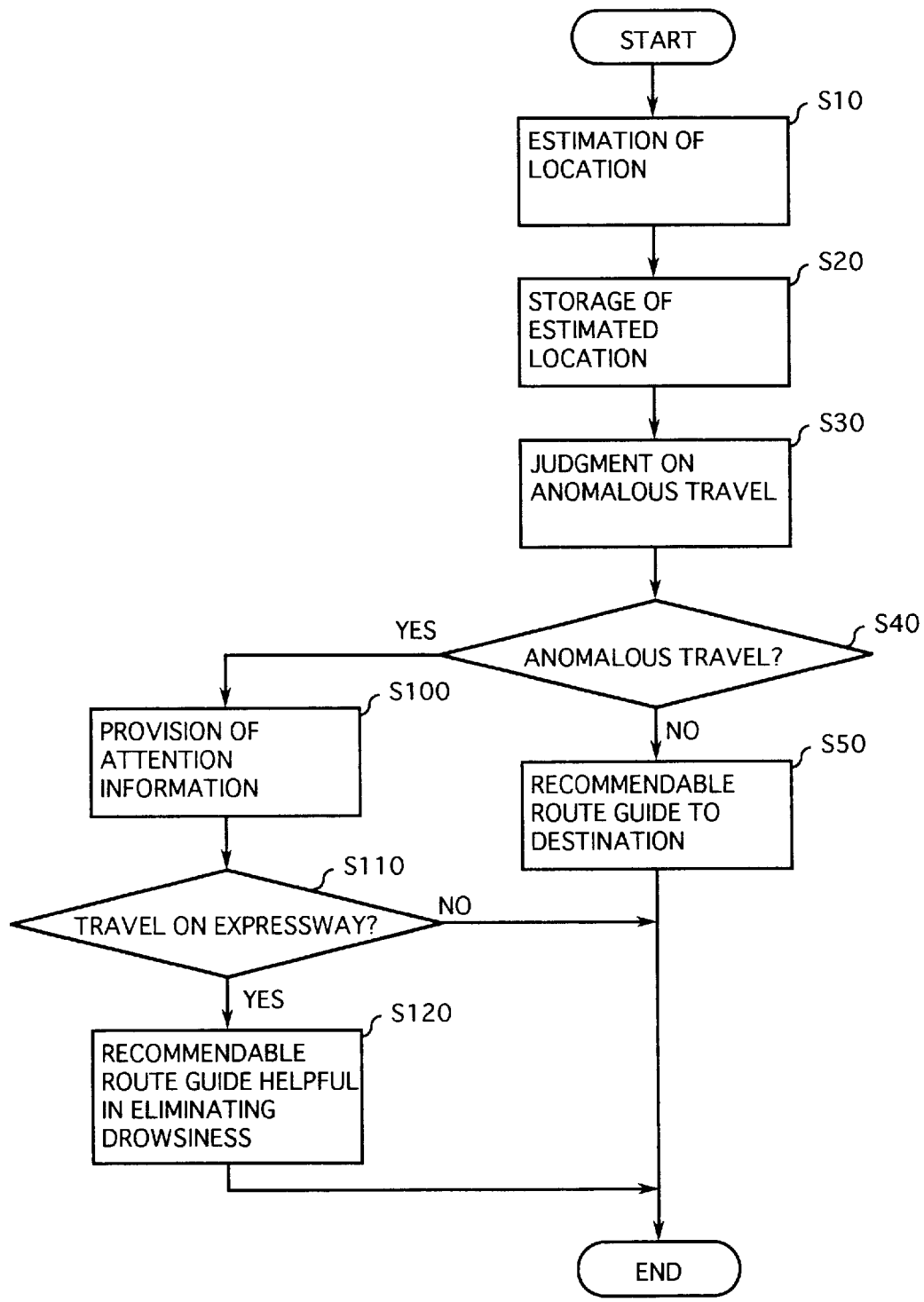
FIG. 4 is a flow chart showing an operation of the driver assisting apparatus shown in FIG. 1.

The operation of the driver assisting apparatus serving as an anomalous travel preventing apparatus will be described hereinafter in detail with reference to FIG. 4 which is in the form of a flow chart.

In a step S10, the CPU of the microprocessor 17 executes the location estimation program to estimate the current location of the vehicle. Specifically, a travel locus of the vehicle is calculated on the basis of the output of the heading sensor 11 and the output of the distance sensor 12 and compared with road patterns included in the road map data. Based on the result of the comparisons, the current location of the vehicle is estimated. The step S10 is followed by a step S20 in which the estimated current location of the vehicle is stored in the RAM of the microprocessor 17 for a while. The step S20 proceeds to a step S30 to execute the anomalous travel detection program. In a step S40, the judgment is made upon whether the travel of the vehicle is anomalous or not. More specifically, a judgment is made upon whether travel data based on the output of the heading sensor 11 and accumulatively stored in the RAM of the microprocessor 17 is coincident in dynamic characteristic with the anomalous travel data previously sampled and stored in the ROM of the microprocessor 17 or the CD-ROM 16. If the microprocessor 17 judges that the travel data is not coincident in dynamic character with the previously sample and stored anomalous travel data, i.e., if the answer in the step S40 is in the negative "NO", the step S40 proceeds to a step S 50. If the microprocessor 17 judges that the travel data derived from the heading sensor 11 is coincident in dynamic character with the anomalous travel data, i.e., the answer in the step S40 is in the affirmative "YES", the step S40 proceeds to a step S100. In the step S50, the route calculation program and the route guide program is executed by the CPU of the microprocessor 17 to inform the vehicle driver of a recommendable route toward the destination through the display unit 19.

In the step S100, the microprocessor 17 causes the voice output unit 18 to provide the vehicle driver with attention information that the drowsiness comes over the vehicle driver. The step S100 is followed by a step S110 in which a judgment is made upon whether vehicle is traveling on an expressway or not. If the answer in the step S110 is in the affirmative "YES", the step S110 proceeds to a step S120 to provide the vehicle driver with information that is helpful in eliminating the drowsiness from the vehicle driver.

The operation of the driver assisting apparatus in the step S120 will be described hereinafter in detail with reference to FIG. 5 which is in the form of a flowchart.

In a step S200, a link number assigned to a link on which the vehicle is traveling at present is obtained. At this time, the link number is derived with ease from route data indicative of the recommendable travel route between the starting point and destination point because of the facts that the route data indicative of the recommendable travel route is already obtained and that the vehicle is traveling on the recommendable travel route at present. The step S200 is followed by a step S210 in which a judgment is made upon whether an end point of the link on which the vehicle is traveling at present is an interchange or not, on the basis of the link number with reference to route network table shown in FIG. 2. If the answer in the step S210 is in the negative "NO", the step S210 proceeds to a step S 220 to obtain another link number assigned to a link adjacent to the previous link on the recommendable travel route. The step S220 returns to the step S210 and accordingly the steps S210 and S220 are repeated until the answer in the step S220 is changed to the affirmative "YES". The repetition of the steps S210 and 220 cause the microprocessor 17 to obtain link numbers assigned to links which form a travel route from the current location of the vehicle to the interchange. Assuming that the vehicle is traveling on a road segment corresponding a link L1 shown in FIG. 6 and that an intersection corresponding to a node P4 shown in FIG. 6 is an interchange, the repetition of the steps S210 and S220 is finished at a time when an end point of a link L3 is judged.

Figure 6:
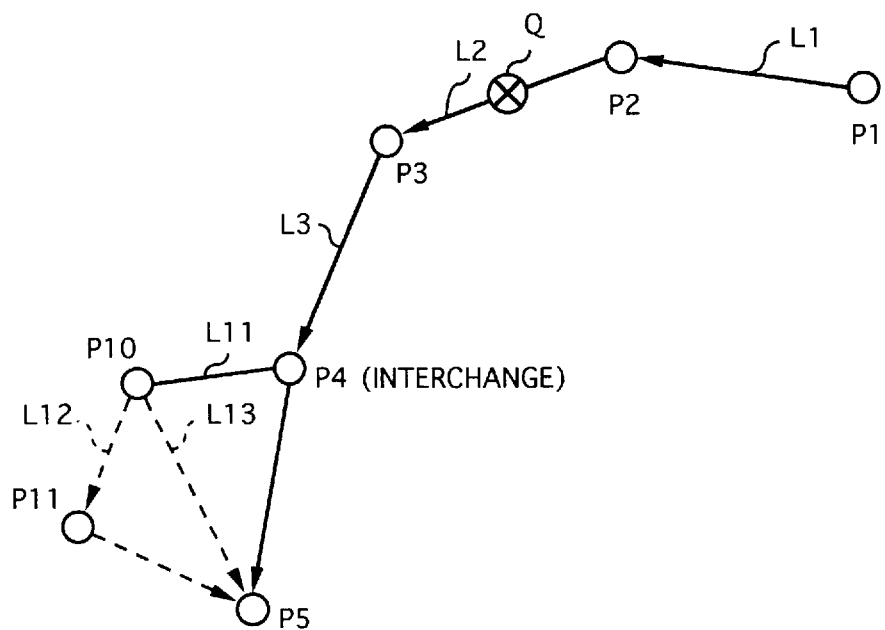
FIG. 6 is a diagram showing links obtained in a step S200 shown in FIG. 5.

If the answer in the step S210 is in the affirmative "YES", the step S210 proceeds to a step S230 to calculate a recommendable travel route from the current location of the vehicle to the destination point for example shown as a node P5 in FIG. 6 by way of the interchange corresponding for example to the node P4 shown in FIG. 6. The step S230 proceeds to a step S240 to provide the vehicle driver, through the display unit 19 and the voice output unit 18, with route guide information as to a recommendable travel route calculated in the step S230. The route guide information includes not only the recommendable travel route calculated in the step S230 but also a distance and/or a time required during the travel from the current location of the vehicle to the destination point by way of the interchange.

Figure 7:
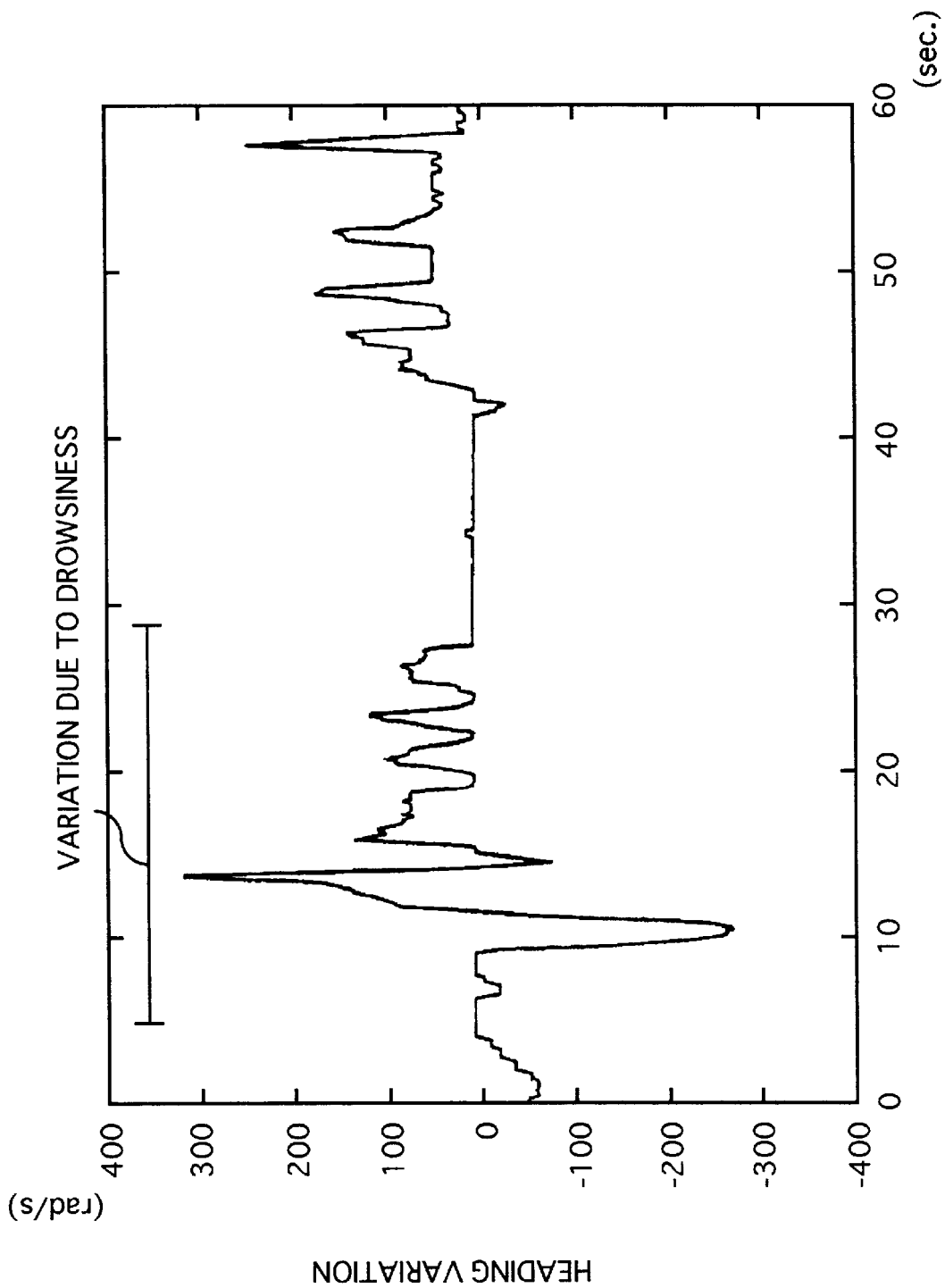
FIG. 7 is a graph showing heading variation due to drowsiness.
Figure 8:
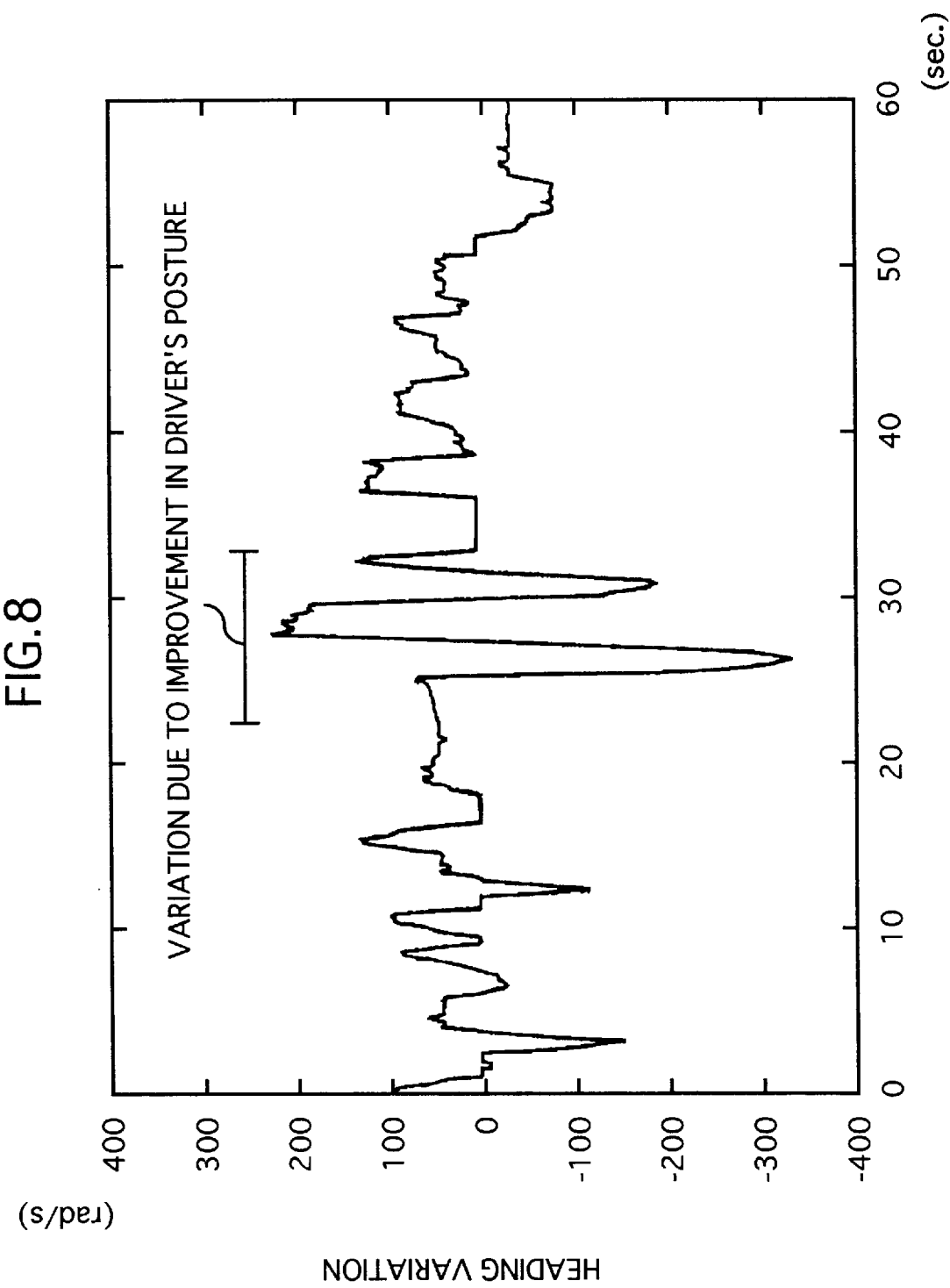
FIG. 8 is a graph showing heading variation due to improvement in vehicle driver's posture.

Although the foregoing description is made on the assumption that the anomalous travel of the vehicle is caused by the drowsiness coming over the vehicle driver, the anomalous travel or unstable action of the vehicle is also caused by other factors as follows. Firstly, the travel of the vehicle could become anomalous under the influence of emotional tumult of the vehicle driver. If, for example, the vehicle driver loses his or her temper, the vehicle driver is apt to roughly drive. Secondly, the travel of the vehicle could become anomalous under the influence of a condition of the vehicle. If, for example, a steering system of the vehicle has trouble in operating, the vehicle driver can hardly drive at his or her will. Thirdly, the travel of the vehicle could become anomalous under the influence of road conditions upon which the vehicle is traveling. If, for example, a road on which the vehicle is traveling is bumpy, the vehicle driver can hardly drive at his or her will. Fourthly, the travel of the vehicle could become anomalous under the atmospheric conditions upon which the vehicle is traveling. If, for example, the vehicle is traveling under bad weather such as a windstorm or a rainstorm, the vehicle driver can hardly drive at his or her will. The driver assisting apparatus is capable of detecting these anomalous travels or unstable actions of the vehicle by previously sampling and storing, in the ROM of the microprocessor 17 or the CD-ROM 16, movement variation of the vehicle caused by the foregoing factors and, by comparing the current output of the sensors for detecting the movement of the vehicle with the heading variation of the vehicle stored in the ROM of the microprocessor 17. FIG. 7 shows, by way of example, the heading variation of the vehicle, i.e., the output of the heading sensor 11 during a certain period including a short period in which the action of the vehicle is unstable and the travel of the vehicle is anomalous under the influence of the drowsiness coming over the vehicle driver. FIG. 8 shows, by way of example, the heading variation of the vehicle, i.e., the output of the heading sensor 11 during a certain period includes a short period in which the vehicle driver improves his or her posture.

If the microprocessor 17 judges that the travel of the vehicle on an expressway becomes anomalous under the influence of the bad weather, a node corresponding to a service area, a refuge area or the like is specified by the microprocessor 17 as a node corresponding to facilities useful to the vehicle driver. At this time, the microprocessor 17 calculates a recommendable travel route from the current point to the facilities such as a service area or refuge area. The microprocessor 17 may detect the bad weather by receiving traffic information comprising identification codes indicative of traffic conditions through a radio set (not shown). For example, the microprocessor 17 recognizes weather to be bad when a location specified by the received identification codes is within a certain area extending from the current location of the vehicle and when weather indicated by the received identification codes is bad.

In addition, the microprocessor 17 may detect the trouble of the steering system of the vehicle on the basis of output of sensors mounted on the vehicle for sensing conditions of the steering system. In this case, the microprocessor specifies a node corresponding to a repair station or section as a node corresponding to facilities which are effective in recovering the usual travel of the vehicle. At this time, the microprocessor 17 calculates a recommendable travel route from the current point to the facilities such as a service area with a repair section. Needless to say, the facility information stored in the road network table shown in FIG. 2 comprises information as to the repair station or section.

In the present embodiment, the recommendable travel route from the current location of the vehicle to the facilities effective in recovering the usual travel of the vehicle is given to the vehicle driver when the microprocessor 17 judges that the travel of the vehicle is anomalous. In addition to or instead of the recommendable travel route, the microprocessor 17 may calculate a distance between the current location of the vehicle and the facilities, and give the vehicle driver the calculated distance with a name of facilities as information as to facilities effective in recovering the usual travel of the vehicle.

Figure 5:
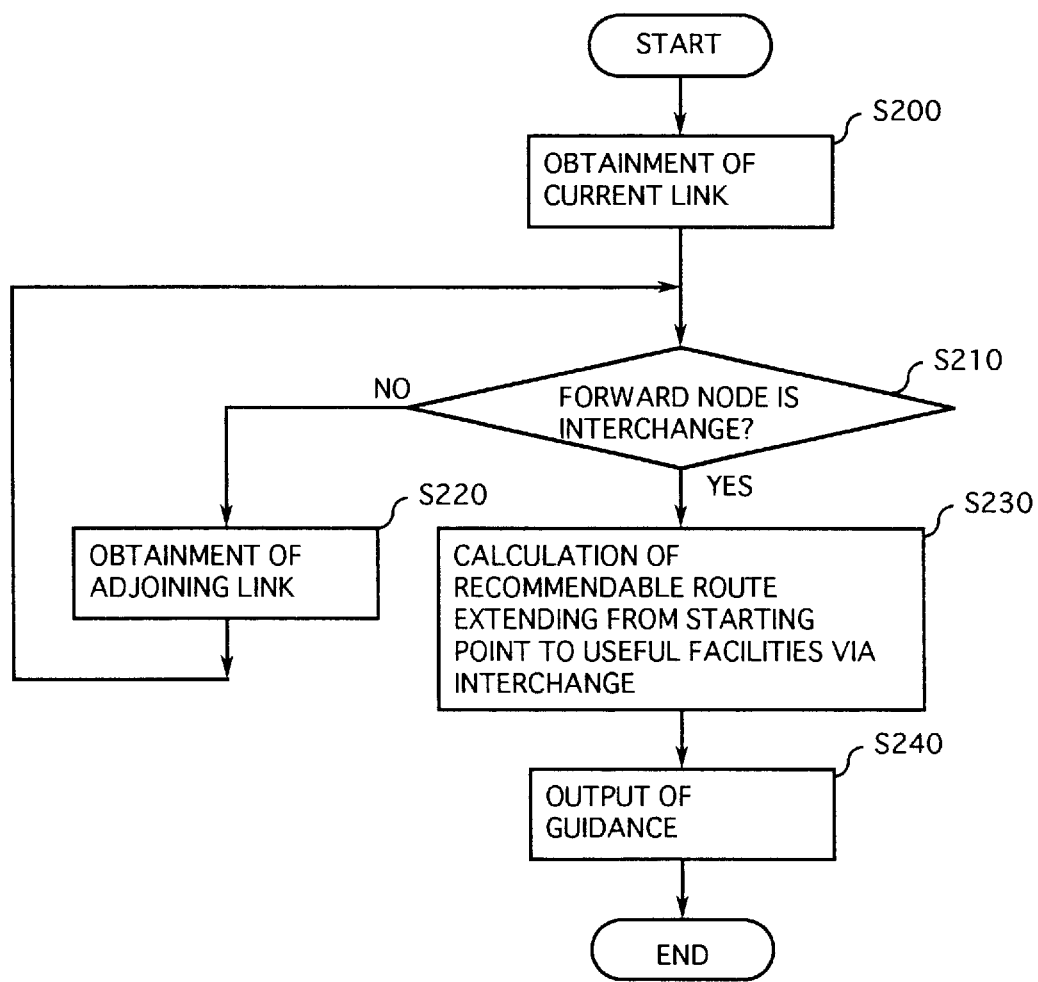
FIG. 5 is a flow chart showing in detail an operation in a step S120 shown in FIG. 4.

Although the node shape data indicative of a shape of a node is read out by the microprocessor 17 from the route network table stored in the CD-ROM 16 in the respective step 220 shown in FIG. 5 and repeated, the microprocessor can previously store the node shape data in the RAM thereof at a time when the recommendable travel route between the starting point and the destination point was calculated. In this case, the microprocessor 17 can derive the node shape data from the RAM to detect, for example, an expressway exit closest to the current location of the vehicle.

From the foregoing description and FIGS. 1 through 8 it will have been appreciated that the first embodiment of the driver assisting apparatus presents numerous advantages described below.

When the travel of the vehicle is usual, the driver assisting apparatus serves as a navigation apparatus capable of guiding the vehicle driver to the destination. When the travel of the vehicle is anomalous, the driver assisting apparatus serves as an anomalous travel preventing apparatus capable of preventing the vehicle from traveling anomalously. In the present embodiment, the driver assisting apparatus having both functions is constituted by the same hardware as a prior-art navigation apparatus. Specifically, the heading sensor 11, the distance sensor 12, the GPS receiver 21, the microprocessor 17, the disk drive unit 15, the voice output unit 18 and the display unit 19 are held in common in both cases that the driver assisting apparatus serves as a navigation apparatus and that the driver assisting apparatus serves as an anomalous travel preventing apparatus. The aforesaid hardware devices are provided for a conventional navigation apparatus. Therefore, the driver assisting apparatus according to the present invention can be reduced in cost and in the number of devices.

In addition, the driver assisting apparatus provides the vehicle driver with facility information as to a relation between the current location of the vehicle and facilities effective in causing the vehicle to recover from the anomalous travel when the driver assisting apparatus judges that the travel of the vehicle is anomalous. This means that the vehicle driver can take swiftly an action suitable to recover the vehicle from the anomalous travel. The vehicle driver's displeasure is moderated even if the driver assisting apparatus mistakenly judges that the travel of the vehicle is anomalous. The reason for this is that the facility information is transmitted in a roundabout way.

Since the aforesaid facility information includes a recommendable travel route between the current location of the vehicle and the facilities, the vehicle driver can arrive at the facilities with ease.

When the vehicle is traveling on an expressway and when the driver assisting apparatus detects the anomalous travel of the vehicle due to a drowsiness coming over the vehicle driver, the driver assisting apparatus provides the vehicle driver with expressway exit information as to an expressway exit of the expressway closest to the current location of the vehicle. In general, travel on expressways is apt to make the vehicle driver feel drowsy, while travel on general roads including no expressway gives the vehicle driver many stimuli effective in awaking him or her. The vehicle driver is guided to the general roads in accordance with the expressway exit information and as a consequence the vehicle driver can recover from the drowsiness. In case that the driver assisting apparatus provides the vehicle driver with not only the expressway exit information but also recommendable travel route information as to recommendable travel route from the current location of the vehicle to a destination of the vehicle driver by way of the expressway exit, the vehicle driver can arrive at the destination through the general roads with ease and safety.

Figure 9:
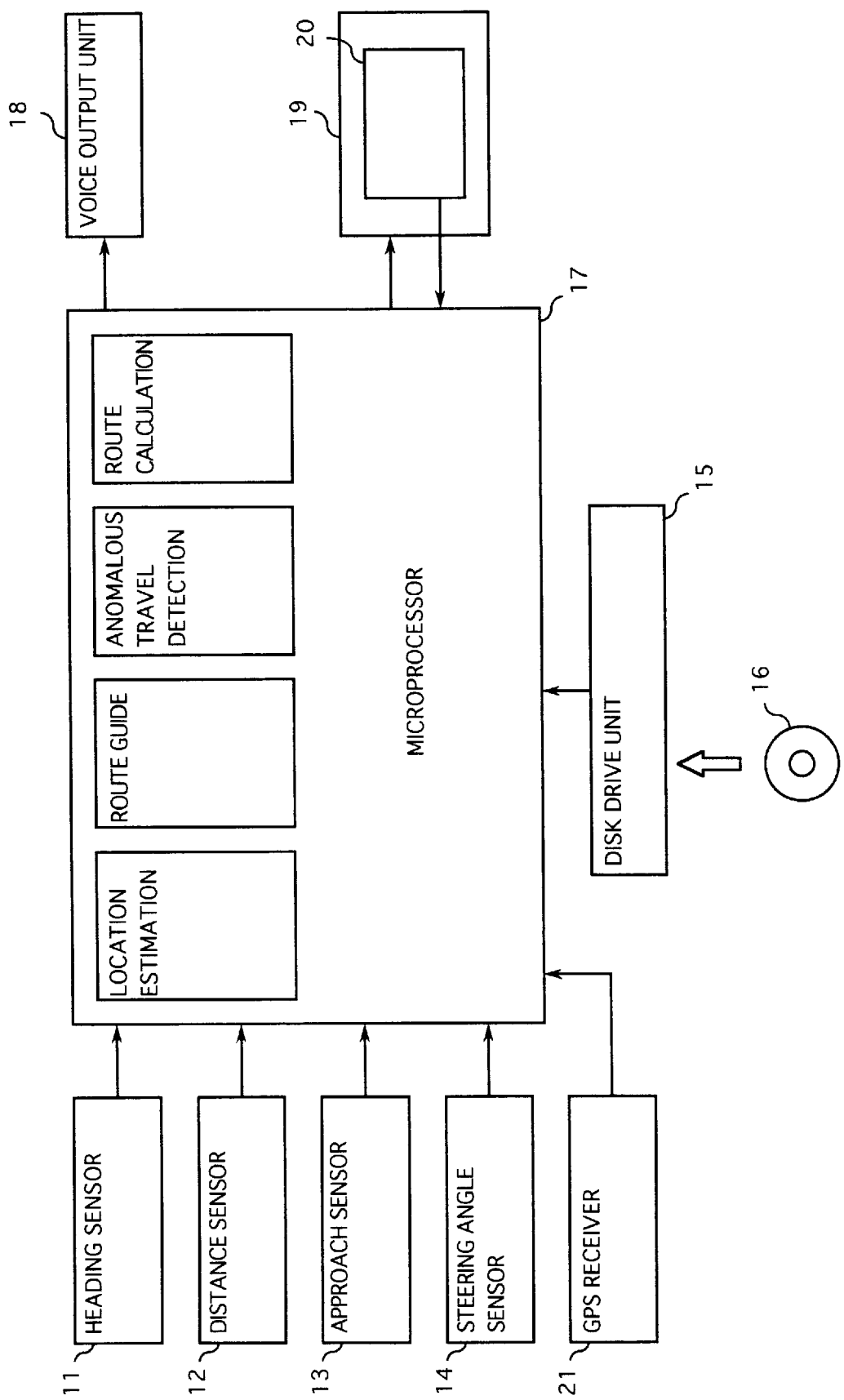
FIG. 9 is a block diagram of a second embodiment of the driver assisting apparatus according to the present invention.

FIG. 9 shows a second embodiment of the driver assisting apparatus according to the present invention. The second embodiment of the driver assisting apparatus includes the same devices and units as the first embodiment of the driver assisting apparatus does. The device and units of the second embodiment are respectively designated by the reference numerals denoting the individual devices and units of the first embodiment for omitting repeated description thereof.

The driver assisting apparatus is shown in FIG. 9 as comprising a sensor 13 for detecting a distance between the driver's vehicle and the preceding vehicle, a steering angle sensor 14 for detecting a steering angle of a steering-wheel of the vehicle. In the second embodiment, the microprocessor 17 can detect the anomalous travel of the vehicle on the basis of output of the sensor 13 and the steering angle sensor 14. Since the microprocessor 17 can judge that the travel of the vehicle is anomalous, on the basis of many indicators of the travel condition of the vehicle, the judgment can be made more accurately. The indicators of the travel condition of the vehicle comprises, by way of example, an indicator based on a correlation between sideward the deflection of the vehicle and the actual steering angle of the steering-wheel of the vehicle.

Referring to FIGS. 10 through 13 of the accompanying drawings, a preferred third embodiment of the driver assisting apparatus according to the present invention will be described hereinlater in detail.

Figure 10:
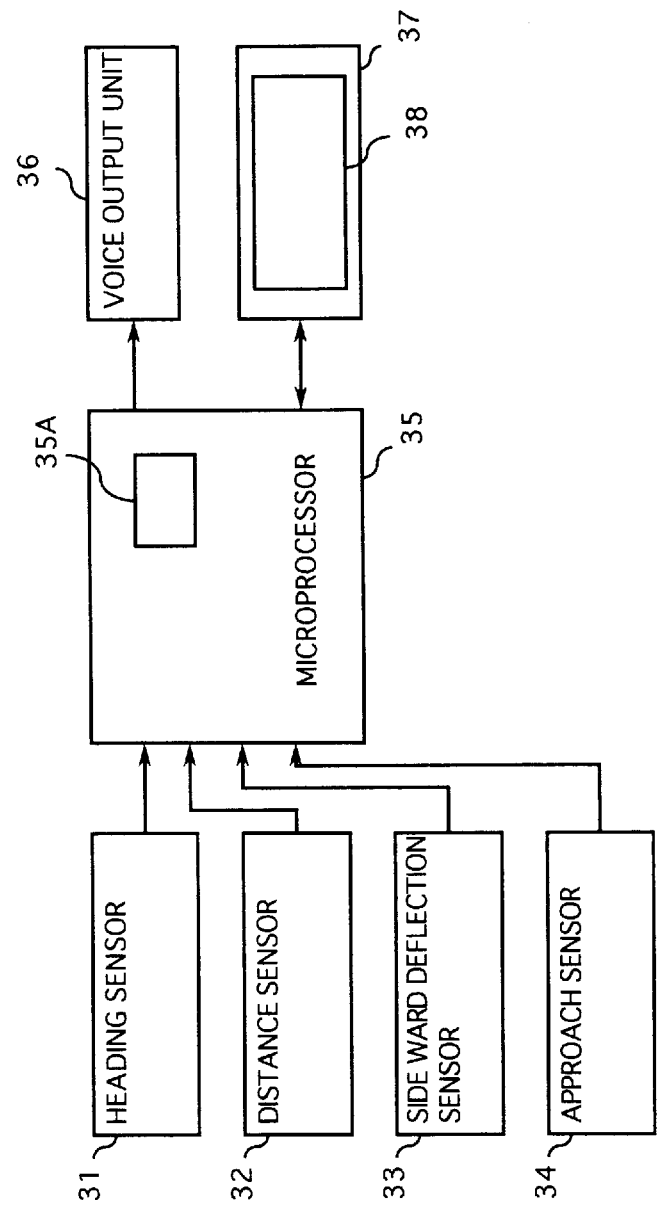
FIG. 10 is a block diagram of a third embodiment of the driver assisting apparatus according to the present invention.

The driver assisting apparatus is mounted on a vehicle and shown in FIG. 10 as comprising a heading sensor 31, a distance sensor 32, a sideward deflection sensor 33, an approach sensor 34, a microprocessor 35, voice output unit 36 and a display unit 37. The heading sensor 31 is designed to detect a heading of the vehicle. The distance sensor 32 is designed to detect a travel distance of the vehicle by detecting revolution speed of wheels of the vehicle. The sideward deflection sensor 33 is adapted to detect a side ward deflection of the vehicle. The approach sensor 34 is adapted to detect a distance between the vehicle and an obstruction such as the preceding vehicle.

The microprocessor 35 comprises a CPU for executing a wide variety of programs, a ROM for storing the programs therein and a RAM for temporally storing the programs loaded thereinto from the ROM and data calculated by the execution of programs. The programs includes four different main programs consisting of a location estimation program, an anomalous travel detection program, a route calculation program and an information provision program.

When the location estimation program is executed by the CPU of the microprocessor 35, a travel locus is calculated on the basis of output of the heading sensor 31 and the distance sensor 32 and is compared with roads stored as road map data in the CD-ROM (not shown). Based on the results of the comparison calculation, the current location of the vehicle is estimated.

When the anomalous travel detection program is executed by the CPU of the microprocessor 35, a judgment is made upon whether the travel condition of the vehicle is anomalous or not, on the basis of the output of the heading sensor 31 and the distance sensor 32 and the results of the calculations by the CPU of the microprocessor 35. If the CPU of the microprocessor 35 detects the anomalous travel of the vehicle by executing the anomalous travel detection program, the CPU of the microprocessor 35 instructs the voice output unit 36 and the display unit 38 to provide the vehicle driver with attention information that the travel of the vehicle is anomalous. The anomalous travel of the vehicle is detected on the basis of four different indicators which indicate the travel conditions of the vehicle. The four different indicators consist of a meandering indicator on the basis of which a judgment is made upon whether a degree of the meandering of the vehicle exceeds an usual level or not, thereby detecting that the travel locus of the vehicle is unsteady, a sideward deflection indicator on the basis of which a judgment is made upon whether a degree of the sideward deflection of the vehicle exceeds an usual level or not, a relative velocity indicator on the basis of which a relative speed of the vehicle with respect to an obstruction exceeds an usual level or not, and an approach indicator on the basis of which a distance between the vehicle and an obstruction such as the preceding vehicle is shorter than an usual level or not.

When the route calculation program is executed by the CPU of the microprocessor 35, a recommendable route is calculated on the basis of the road map data stored in the CD-ROM, and a starting point, a transit point and a destination point designated by the vehicle driver. The recommendable route extends from the starting point to the destination by way of the transit point.

When the information provision program is executed by the CPU of the microprocessor 35, route guide information useful to the vehicle driver is displayed through the display unit 37 and provided as voice information for the vehicle driver through the voice output unit 36. The route guide information is so formed as to be useful to the vehicle driver advancing toward the destination point. If the CPU of the microprocessor 35 detects the anomalous travel of the vehicle by executing the aforementioned anomalous travel detection program, the information provision program is executed by the CPU of the microprocessor 35 to provide the vehicle driver with the attention information that the travel of the vehicle is anomalous, through the display unit 37 and the voice output unit 36.

The voice output unit 36 is designed to output guide messages and attention messages in the form of voice in response to the instructions of the CPU of the microprocessor 35. The display unit 37 is designed to output not only the guide and attention messages but also road maps in the form of image in response to the instructions of the CPU of the microprocessor 35. The display unit 37 comprises a liquid crystal display unit or a cathode-ray tube (CRT) for displaying varied information such as route guide information and attention information on its own screen in response to the instructions from the CPU of the microprocessor 35. The route guide information comprises a management menu picture, a road map including the current location of the vehicle and recommendable route extending from the current location, an arrow representative of a direction in which the vehicle ought to advance, messages represented by letters and so on. The display unit 37 is equipped with a transparent touch panel 38 placed on the screen thereof. The transparent touch panel 38 is of a pressure sensitive type and designed to detect a position in which the vehicle driver touches the transparent touch panel 38, and then transmits the detected position to the microprocessor 35. By the detected position, the microprocessor 35 distinguish instructions which the vehicle driver gave to the drive assisting apparatus. In other words, the display unit 37 serves as an interface between the vehicle driver and the microprocessor 35.

The RAM of the microprocessor 35 stores therein a anomalous travel detection table 5A. In the present embodiment, judgment results based on the aforesaid meandering indicator, the sideward deflection indicator, the relative velocity indicator and the approach indicator are stored in the anomalous travel detection table 5A in the form of flag data as shown in FIG. 11. When the degree of the meandering of the vehicle exceeds the usual meandering level, a flag corresponding to the meandering indicator is set to "1". When the degree of the sideward deflection exceeds the usual deflection level, a flag corresponding to the sideward deflection is set to "1". When the relative velocity of the vehicle with respect to the obstruction exceeds the usual velocity level, a flag corresponding to the relative velocity indicator is set to "1". When the distance between the vehicle and the obstruction is shorter than the usual distance level, a flag corresponding to the approach indicator is set to "1".

Figure 12A:
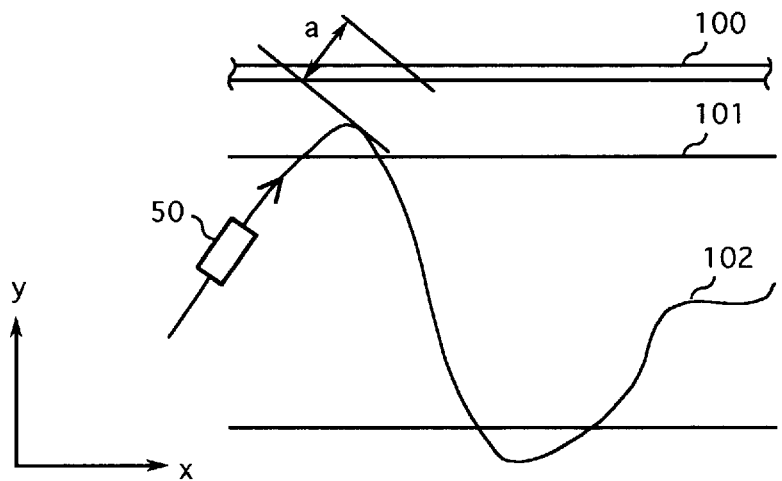
FIGS. 12(a), 12(b) and 12(c) are schematic view for explaining anomalous travel detection techniques.

The anomalous travel of the vehicle based on the meandering indicator is detected through a technique described hereinlater with reference to FIG. 12(a). If the vehicle denoted by a reference numeral 50 travels approximately on a locus line 102 previously stored in the ROM of the microprocessor 35 or the CD-ROM (not shown), the CPU of the microprocessor 35 judges that the travel of the vehicle is anomalous. Mores specifically, the estimated current locations of the vehicle are sampled during a predetermined period. The sampled estimated locations form a travel locus which is drawn in a two dimensional x-y coordinate system where x-axis indicates time and y-axis indicates the location of the vehicle on an imaginary line which intersects, at right angles, a road on which the vehicle is traveling. The travel locus thus drawn is analyzed and as a consequence a judgment is made upon whether there are peculiar high-frequency components resulting from the meandering of the vehicle or not. If there are peculiar high-frequency components, the anomalous travel of the vehicle is detected.

Figure 12B:
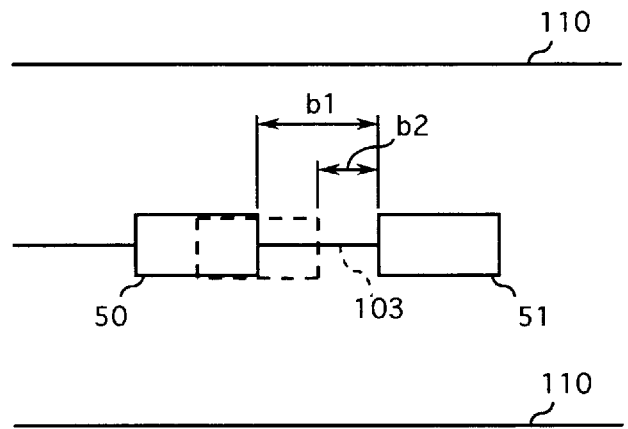

As described above, the anomalous travel based on the approach indicator is detected when the distance between the vehicle and the obstruction is shorter than the usual distance level. The distance is detected by the approach sensor 34. When the vehicle 50 travels in a zigzag direction as shown in FIG. 12(a), a guardrail 100 is recognized as the obstruction. In FIG. 12(a), the usual distance level is represented by a letter "a". When the vehicle 50 follows the vehicle 51 as shown in FIG. 12(b), the vehicle 51 is recognized as the obstruction. If the current distance b1 between the vehicle 50 and the preceding vehicle 51 shown in FIG. 12(b) is reduced to a usual distance level b2, the anomalous travel based on the approach indicator is detected.

The anomalous travel based on the sideward deflection indicator is detected when the sideward deflection sensor 33 detects lines drawn on the road and defining traffic lanes. If, therefore, the vehicle 50 shown in FIG. 12(a) crosses and extremely approaches lines 101 drawn on a road, the anomalous travel of the vehicle is detected.

Figure 12C:
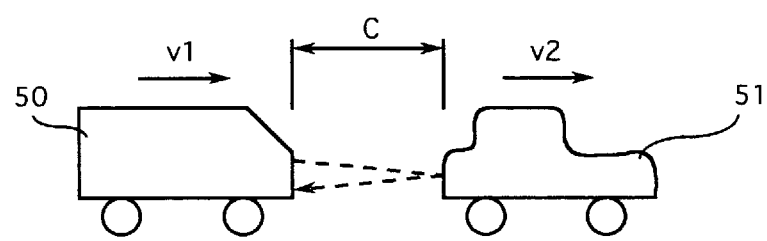

As set forth above, the anomalous travel based on the relative velocity indicator is detected when the relative velocity of the vehicle with respect to the obstruction exceeds the usual velocity level. It is assumed, for example, that the vehicle 50 is traveling at a velocity V1 and the preceding vehicle 51 is traveling at a velocity V2 as shown in FIG. 12(c). If both the velocities V1 and V2 are 100 km/h, the relative velocity is 0 km/h. If the velocities V1 and V2 are 100 km/h and 0 km/h, respectively, the relative velocity is 100 km/h. The velocity V1 of the vehicle 50 is detected on the basis of the distance sensor 32. The velocity V2 of the preceding vehicle 51 is detected on the basis of a variation of a current location of the vehicle 51 with respect to time. The current location of the vehicle 51 is calculated by adding the estimated current location of the vehicle 50 to the distance detected by approach sensor 34, i.e., a distance denoted by a letter "c" in FIG. 12(c).

Figure 13:
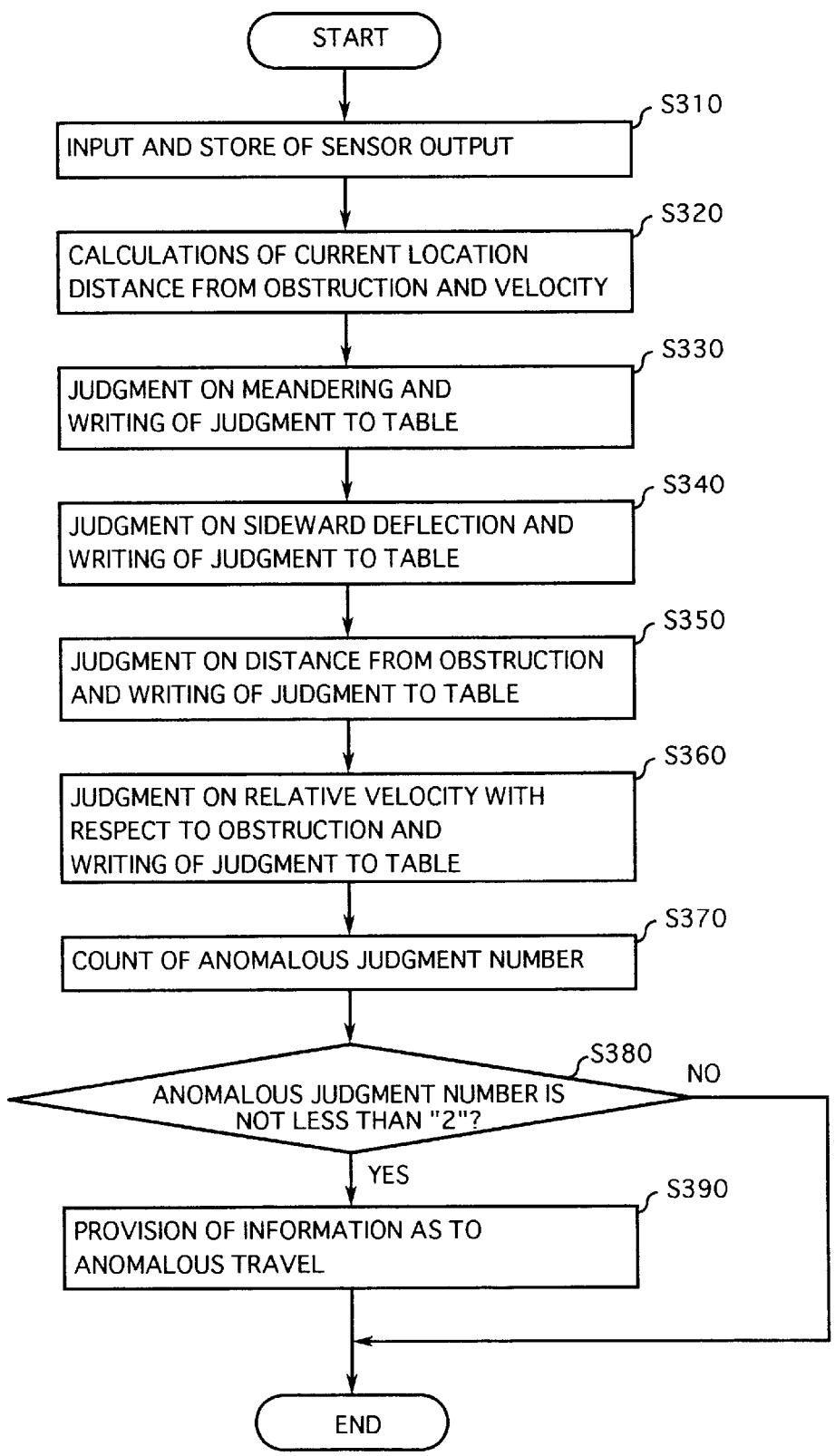
FIG. 13 is a flow chart showing an operation of the driver assisting apparatus shown in FIG. 10.

The operation of the driver assisting apparatus thus constructed will be described hereinafter in detail with reference to FIG. 13 which is in the form of a flowchart.

In step S310, the microprocessor 35 receives the output of the sensors 31, 32, 33 and 34, and stores the received output in the RAM of the microprocessor 35. The step S310 is followed by a step S320 in which not only the current location of the vehicle is estimated, but also the distance between the vehicle and the obstruction, the relative velocity of the vehicle with respect to the obstruction are calculated. The step S320 proceeds to a step S330 to judge whether the vehicle is meanderingly traveling or not. The result of the judgment on meandering is written into the anomalous travel detection table 5A shown in FIG. 11. The step S330 proceeds a step S340 to judge whether the sideward deflection of the vehicle is anomalously large or not. The result of the judgment in the step S340 is written into the anomalous travel detection table 5A. The step S340 proceeds to a step S350 to judge whether the vehicle anomalously approaches the obstruction or not. The result of the judgment in the step S350 is written into the anomalous travel detection table 5A. The step S350 proceeds to a step S360 to judge whether the relative velocity of the vehicle with respect to the obstruction is anomalously large or not. In a step S370, the number of the flags indicating "1", is counted with reference to the anomalous travel detection table 5A. The step S370 is followed by a step S380 in which a judgment is made upon whether the flag count is not less than "2". If the flag count is not less than "2", the step S380 proceeds to a step S390 to provide the vehicle driver with attention messages that the travel of the vehicle is anomalous through the voice output unit 36 and the display unit 37. The attention messages are prepared for the affirmative judgments in the steps S330 to S360, respectively, and indicates contents of the affirmative judgments respectively.

If the result of the judgments in the steps S330 to S360 shown in FIG. 11 are obtained, the voice output unit 36 and the display unit 37 provide the vehicle driver with a attention message indicating "the vehicle is meanderingly traveling" and another attention message indicating "there is a possibility that the vehicle will come into collision with an obstruction or the preceding vehicle".

In the third embodiment, the driver assisting apparatus provides the vehicle driver with attention information that the travel of the vehicle is anomalous only when at least two anomalous travel judgments are affirmative. Accordingly, the driver assisting apparatus is prevented from mistakenly recognize the travel condition of the vehicle to be anomalous. In addition, the driver assisting apparatus detects the anomalous travel of the vehicle with accuracy and quickness if the two anomalous travel judgments are determined as follows. One of the two affirmative judgments is made when the driver assisting apparatus detects that a travel locus of said vehicle is anomalous, i.e., that the vehicle is traveling meanderingly. The other of the two affirmative judgments is made when the driver assisting apparatus detects that the vehicle extremely approach an obstruction.

In addition to the attention information, the driver assisting apparatus provides the vehicle driver with judgment information as to each of the contents of the judgments in the affirmative. Even if, therefore, the driver assisting apparatus mistakenly detects the anomalous travel of the vehicle, the judgment information can prevent the vehicle driver from being put into a flutter by the attention information.

Figure 14:
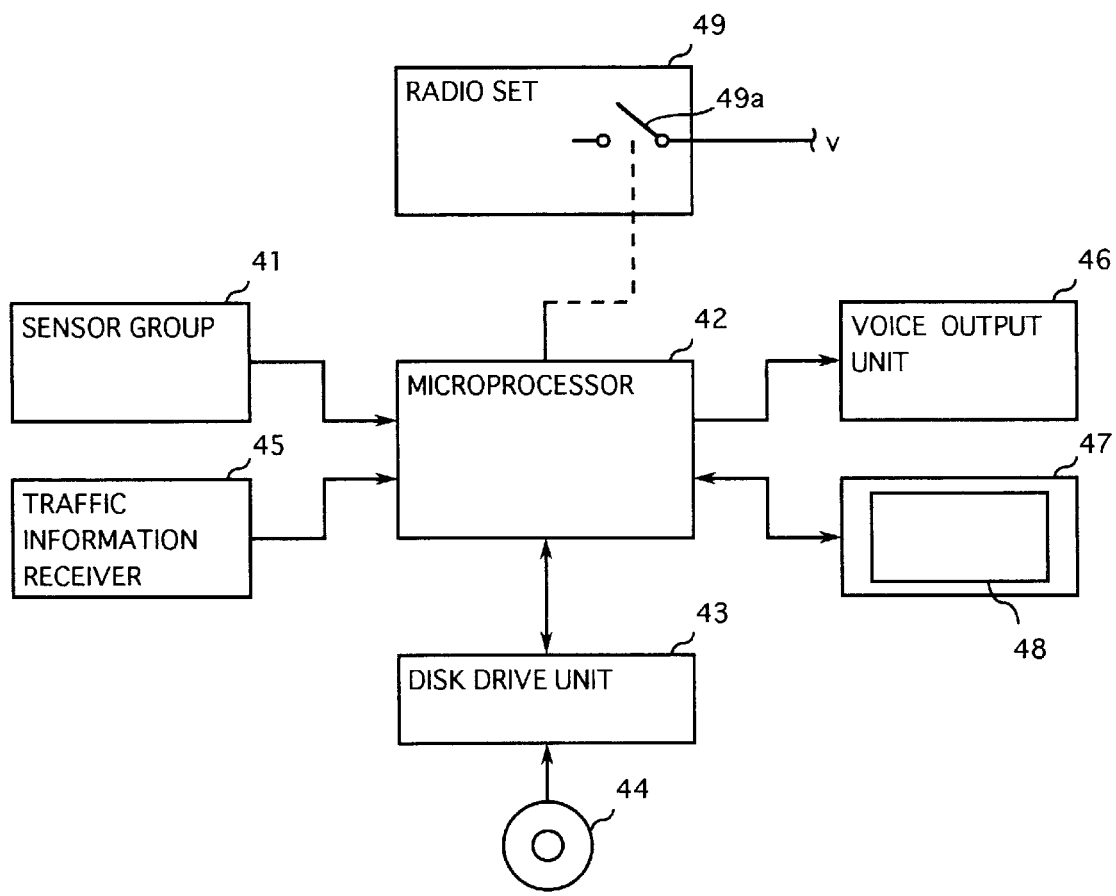
FIG. 14 is a block diagram of a fourth embodiment of the driver assisting apparatus according to the present invention.
Figure 15:
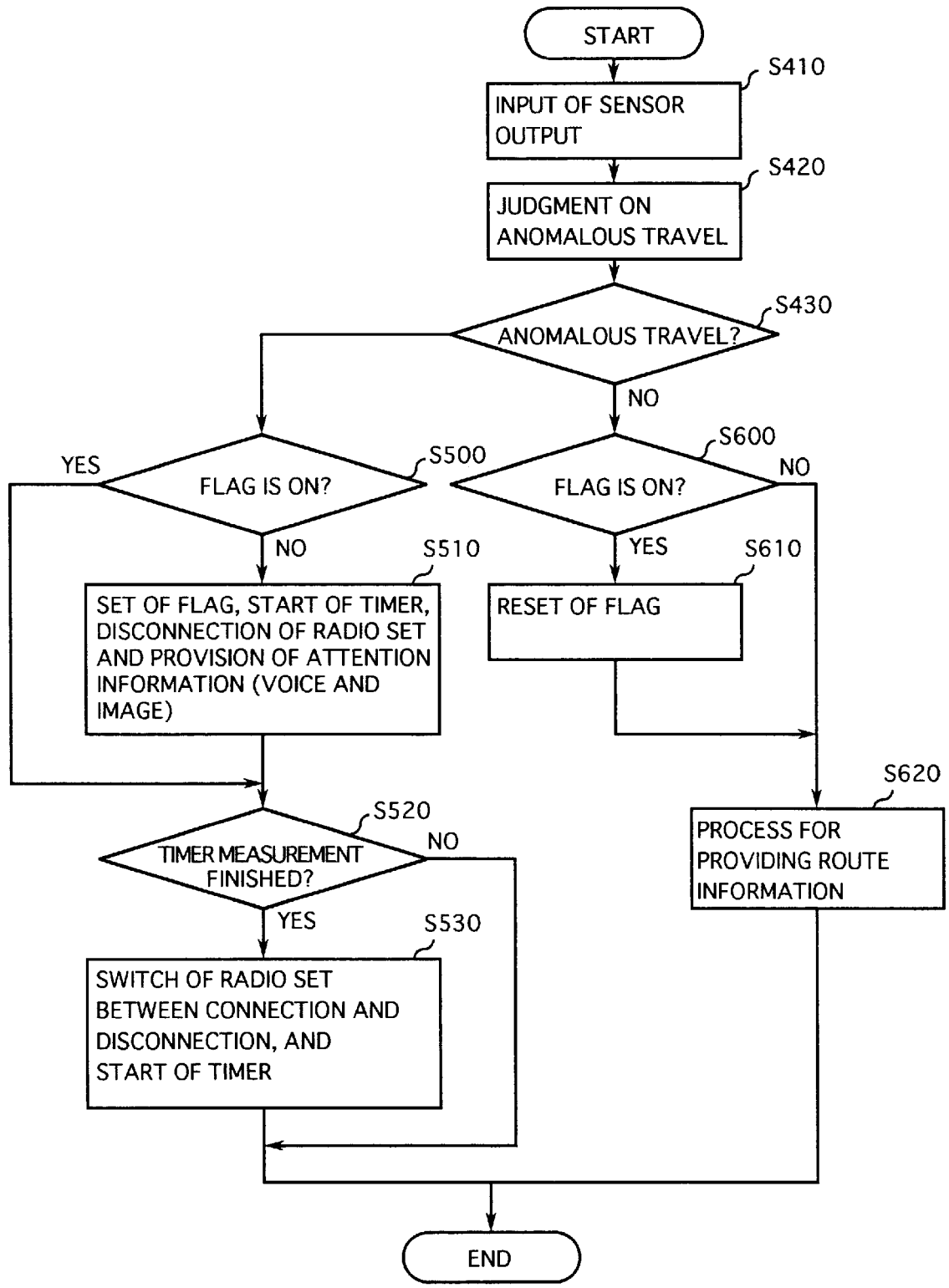
FIG. 15 is a flow chart showing an operation of the driver assisting apparatus shown in FIG. 14.

Referring to FIGS. 14 and 15 of the accompanying drawings, a preferred fourth embodiment of the driver assisting apparatus according to the present invention will be described hereinlater in detail.

The driver assisting apparatus is shown in FIG. 14 as comprising a sensor group 41, a microprocessor 42, a disk drive unit 43, a CD-ROM 44, a traffic information receiver 45, a voice output unit 46, a display unit 47 and a radio set 48. The sensor group 41 comprises a heading sensor for detecting a heading of the vehicle, a distance sensor for detecting a travel distance of the vehicle, sideward deflection sensor for detecting a sideward deflection of the vehicle and a GPS receiver for detecting an absolute location of the vehicle by receiving pseudo-noise codes from three or four GPS satellites revolving around the earth.

The microprocessor 42 comprises a CPU for executing a wide variety of programs, a ROM for storing the programs therein and a RAM for temporally storing the programs loaded thereinto from the ROM and data calculated by the execution of programs. The programs includes four different main programs consisting of a location estimation program, an anomalous travel detection program, a route calculation program, a route guide program and a radio control program.

When the location estimation program is executed by the CPU of the microprocessor 42, a travel locus is calculated on the basis of output of the sensor group 11 and compared with patterns of roads stored as road map data in the CD-ROM 44. Based on the results of the comparison calculation, the current location of the vehicle is estimated. The estimated current location of the vehicle is corrected with reference to the absolute current location detected by the GPS receiver of the sensor group 41.

When the anomalous travel detection program is executed by the CPU of the microprocessor 42, a judgment is made upon whether the travel condition of the vehicle is anomalous or not, on the basis of the output of the sensor group 41 and the results of the calculations by the CPU of the microprocessor 42.

When the route calculation program is executed by the CPU of the microprocessor 42, a recommendable route is calculated on the basis of the road map data stored in the CD-ROM 44, and a starting point, a transit point and a destination point designated by the vehicle driver. The recommendable travel route extends from the starting point to the destination by way of the transit point.

When the route guide program is executed by the CPU of the microprocessor 42, route guide information useful to the vehicle driver is displayed by the display unit 47 and provided as voice information for the vehicle driver. The route guide information is so formed as to be useful for the vehicle driver advancing toward the destination point.

If the CPU of the microprocessor 42 judges that the travel condition of the vehicle is anomalous by executing the aforementioned anomalous travel detection program, the radio control program is executed by the CPU of the microprocessor 42 to control the radio set 49 in the following manner.

The traffic information receiver 45 is adapted to receive traffic information from ground traffic stations. The voice output unit 46 is designed to provide the vehicle driver with the route guide information as voice information in accordance with instructions from the CPU of the microprocessor 42. The route guide information is for example a message "turn right at an intersection placed 500 meters ahead".

The display unit 47 comprises a liquid crystal display or a cathode-ray tube (CRT) for displaying varied information on its own screen in response to instructions from the CPU of the microprocessor 42. The information comprises a management menu picture, a road map including the current location of the vehicle and recommendable route extending from the current location, an arrow representative of a direction in which the vehicle ought to advance, a message represented by letters and so on. The display unit 47 is equipped with a transparent touch panel 48 placed on the screen of the liquid crystal display or the cathode-ray tube. The transparent touch panel 48 is of a pressure sensitive type and designed to detect a position in which the vehicle driver touches the transparent touch panel 48, and then transmits the detected position to the microprocessor 42. By the detected position, the microprocessor 42 distinguish instructions which the vehicle driver gave to the driver assisting apparatus. In other words, the display unit 47 serves as an interface between the vehicle driver and the microprocessor 42.

The disk drive unit 43 is adapted to read out data from the CD-ROM 44 and transmit the read out data to the microprocessor 42 in response to instructions from the microprocessor 42. The data stored in the CD-ROM 44 is written onto a route network table such as the table shown in FIG. 2.

The radio set 49 comprises a switch 49a for turning on and off electric current supply to the radio set 49, a receiver for receiving radio waves from a broadcast stations and a loudspeaker for providing the vehicle driver with voice information. The switch 49a is controlled by the microprocessor 42 as well as by the manual operation of the vehicle driver.

The operation of the driver assisting apparatus thus constructed will be described hereinafter in detail with reference to FIG. 15 which is in the form of a flow chart. When the driver assisting apparatus is switched on, the following flag indicating the anomalous travel of the vehicle is reset to "0". After the driver assisting apparatus is switched on, the operation shown in FIG. 15 is repeated by the CPU of the microprocessor 42 at predetermined regular intervals.

In a step S410, the microprocessor 42 receives the output sensor group 41 and stores the received output in the RAM of the microprocessor 42. Based on the output of the sensor group 41, not only the current location of the vehicle is estimated, but also indicators of the travel condition of the vehicle are calculated. The step S410 is followed by a step S420 in which a judgment is made upon whether the vehicle is anomalously traveling or not, on the basis of at least one of the indicators of the travel condition of the vehicle. In the present embodiment, a travel locus derived from the estimated current locations is analyzed in order to judge whether there are peculiar high-frequency components resulting from the meandering of the vehicle or not. If there are peculiar high-frequency components, the microprocessor 42 recognizes that a drowsiness comes over the vehicle driver. If the answer in the step S430 is in the affirmative "YES", the step S430 proceeds to a step S500 in which a judgment is made upon whether a flag indicating the anomalous travel of the vehicle is on or not. If the answer in the step S500 is in the negative "NO", the step S500 proceeds to a step S510 to carry out four operations described as follows. Firstly, the flag is set to "1". Secondly, a timer included in the microprocessor 42 is started. Thirdly, the switch 49a is turned on. Fourthly, attention information as to the anomalous travel of the vehicle is given to the vehicle driver through the voice output unit 46 and the display unit 47. The step S510 is followed by a step S520. If the answer in the step S500 is in the affirmative "YES", the step S500 proceeds to the same step S520. In the step S520, a judgment is made upon whether measurement of the timer is finished or not. If the answer in the step S520 is in the affirmative "YES", the step S520 proceeds to a step S530 to carry out two operations as follows. Firstly, the switch 49a of the radio set 49 is turned off when the switch 49a is on. The switch 49a of the radio set 49 is turned on when the switch 49a is off. Secondly, the timer is started. When the control operation shown in FIG. 15 is carried out for the first time, the answer in the step S520 should be in the negative "NO".

When the control operation shown in FIG. 15 is carried out for the second time and when the answer in the step S430 is in the affirmative "YES", the control sequence is constituted by the steps S410, S420, S430, S500 and S520. The control sequence is repeated until the measurement of timer is finished. If the measurement of the timer is finished, the step S520 proceeds to the step S530 to turn off the switch 49a of the radio set 49 and to restart the timer. The control sequence of the steps S410, S420, S430, S500 and S520 is repeated until the answer in the step S520 is in the affirmative "YES". If the timer is finished, the step S520 proceeds to the step S530 to turn on the switch 49a of the radio set 49 and to restart the timer. While the answer in the step S430 is kept in the affirmative "YES", i.e., while the travel condition of the vehicle is anomalous, the step S430 is repeated at regular intervals each corresponding approximately to a period measured by the timer. The period measured by the timer is, for example, several seconds. As a result, the voice output of the radio set 49 is intermittently stopped, thereby making it possible to awake the vehicle driver from a state of drowsiness.

If the answer in the step S430 is in the negative "NO", the step S430 proceeds to a step S600 to judge whether the flag is "ON" or not. If the answer in the step S600 is in the affirmative "YES", the step S600 proceeds to a step S610 to reset the flag to "0" and to a step S620. If the answer in the step S600 is in the negative "NO", the step S600 proceeds to the step S620. In the step S620, the route guide program is executed by the CPU of the microprocessor 42 to provide the vehicle driver with the route guide information including, for example, route information as to a recommendable travel route toward a destination designated by the vehicle driver. Therefore, the output of the voice output unit 46 and the display unit 47 is changed from anomalous travel information to the route guide information. The control sequence of the steps S410, S420, S430, S600 and S620 is repeated until the answer in the step S430 is changed to the affirmative "YES".

In the present embodiment, the radio set 49 is intermittently stopped from providing the voice information for the vehicle driver when the driver assisting apparatus detects the anomalous travel of the vehicle, thereby making it possible to awake the vehicle driver. If the vehicle fails to recover from the anomalous travel after the intermittence of the radio set 49, the driver assisting apparatus may turn up the volume of the radio set 49 to ensure that the vehicle driver is awoken. Alternatively, other audio set such as an onboard stereo set may be intermittently stopped from providing voice information such as music for the vehicle driver when the driver assisting apparatus detects the anomalous travel of the vehicle. It will be furthermore understood that the display unit 48 or an interior illuminator may be intermittently stopped from operating in order to recover the vehicle driver from the drowsiness.

Even if the driver assisting apparatus mistakenly recognizes the travel of the vehicle to be anomalous, the vehicle driver's displeasure is moderated. The reason for this is that the intermittence of the voice information from the radio set 49 is not offensive to the ear so much as an alarm such as beep. In addition, the driver assisting apparatus is operated to provide the vehicle driver with attention voice information instead of the guide voice information when the anomalous travel of the vehicle is detected by the driver assisting apparatus, thereby making it possible to certainly give the vehicle driver information that the travel of the vehicle is anomalous. Furthermore, instead of the attention voice information, music effective in causing the vehicle driver to recover from the drowsiness may be provided for the vehicle driver when the anomalous travel of the vehicle is detected by the driver assisting apparatus. The music can be previously stored in the CD-ROM 44.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling with the scope of the invention.

What is claimed is:

1. An apparatus mounted on a vehicle for assisting a vehicle driver in carefully driving, comprising:

data obtaining means for obtaining vehicle movement data indicative of a movement of said vehicle;

estimating means for estimating a current location of said vehicle on the basis of the vehicle movement data obtained by said data obtaining means;

information providing means for providing said vehicle driver with guide information as to the current location of said vehicle estimated by said estimating means;

judging means for judging whether action of said vehicle is unstable or not, on the basis of the vehicle movement data obtained by said obtaining; and information providing means for producing destination information as to a relation between the current location of said vehicle and a destination of said vehicle driver;

said information providing means being operated to provide said vehicle driver with attention information that the action of said vehicle is unstable when said judging means judges that the action of said vehicle is unstable;

said information providing means being operated to further provide said vehicle driver with said destination information to guide said vehicle driver to said destination, said information producing means being operated to replace said destination with facilities effective in causing said vehicle to recover from the unstable action to produce facility information as to a relation between the current location of said vehicle and said facilities when said judging means judges that the action of said vehicle is unstable, and said information providing means being operated to further provide said vehicle driver with said facility information to guide said vehicle driver to said facilities previous to said destination.

2. An apparatus as set forth in claim 1, in which said facility information includes a direction from the current location of said vehicle toward said facilities.

3. An apparatus as set forth in claim 1, in which said facility information includes a distance between the current location of said vehicle and said facilities.

4. An apparatus as set forth in claim 1, in which said facility information includes a recommendable route between the current location of said vehicle and said facilities.

5. An apparatus mounted on a vehicle for assisting a vehicle driver in carefully driving, comprising:

data obtaining means for obtaining vehicle movement data indicative of a movement of said vehicle;

estimating means for estimating a current location of said vehicle on the basis of the vehicle movement data obtained by said data obtaining means;

information providing means for providing said vehicle driver with guide information as to the current location of said vehicle estimated by said estimating means;

judging means for judging whether action of said vehicle is unstable or not, on the basis of the vehicle movement data obtained by said obtaining means; and information producing means for producing facility information as to facilities effective in causing said vehicle to recover from the unstable action when said judging means judges that the action of said vehicle is unstable;

said information providing means being operated to further provide said vehicle driver with said facility information to guide said vehicle driver to said facilities.

6. An apparatus as set forth in claim 5, in which said facility information includes a distance from the current location of said vehicle toward said facilities.

7. An apparatus as set forth in claim 5, in which said facility information includes a distance between the current location of said vehicle and said facilities.

8. An apparatus as set forth claim 5, in which said facility information includes a recommendable route between the current location of said vehicle and said facilities.

9. An apparatus mounted on a vehicle for assisting a vehicle driver in carefully driving, comprising:

data obtaining means for obtaining vehicle movement data indicative of a movement of said vehicle;

estimating means for estimating a current location of said vehicle on the basis of the vehicle movement data obtained by said data obtaining means;

information providing means for providing said vehicle driver with guide information as to the current location of said vehicle estimated by said estimating means;

judging means for judging whether action of said vehicle is unstable or not, on the basis of the vehicle movement data obtained by said obtaining means; and information producing means for producing expressway exit information as to an expressway exit of said expressway closest to the current location of said vehicle when said vehicle is traveling on said expressway and when said judging means judges that the action of said vehicle is unstable;

said information providing means being operated to provide said vehicle driver with said expressway exit information produced by said information producing means, and said expressway exit information including a distance between the current location of said vehicle and the expressway exit of said expressway closest to the current location of said vehicle.

10. An apparatus mounted on a vehicle for assisting a vehicle driver in carefully driving, comprising:

data obtaining means for obtaining vehicle movement data indicative of a movement of said vehicle;

estimating means for estimating a current location of said vehicle on the basis of the vehicle movement data obtained by said data obtaining means;

information providing means for providing said vehicle driver with guide information as to the current location of said vehicle estimated by said estimating means;

judging means for judging whether action of said vehicle is unstable or not on the basis of the vehicle movement data obtained by said obtaining means, and information producing means for producing facility information as to facilities effective in eliminating the drowsiness from the vehicle driver when said judging means judges that the action of said vehicle is unstable, said information providing means being operated to provide said vehicle driver with attention information that the action of said vehicle is unstable when said judging means judges that the action of said vehicle is unstable;

said judging means judging that the action of said vehicle is unstable when the action of said vehicle corresponds to a vehicle action pattern predetermined to be caused by a drowsiness which comes over said vehicle driver, said information providing means being operated to provide said vehicle driver with said facility information to guide said vehicle driver to said facilities.

11. An apparatus mounted on a vehicle for assisting a vehicle driver in carefully driving, comprising:

data producing means for producing a plurality of different vehicle movement data sets each indicative of a movement of said vehicle;

judgment means for making a plurality of judgments upon whether action of said vehicle is unstable or not, on the basis of said vehicle movement data sets, respectively; and information providing means for providing said vehicle driver with attention information that action of said vehicle is unstable only when at least two judgments are affirmative, said information providing means being operated to further provide said vehicle driver with judgment information sets as to contents of the affirmative judgments, respectively, and one of said two affirmative judgments being made when said judgment means detects that a travel locus of said vehicle is unsteady, the other of said two affirmative judgments being made when said judgment means detects that said vehicle anomalously approaches an obstruction.

12. An apparatus mounted on a vehicle for assisting a vehicle driver in carefully driving, comprising:

information providing means for providing said vehicle driver with voice information;

data obtaining means for obtaining vehicle movement data indicative of a movement of said vehicle;

judging means for judging whether action of said vehicle is unstable or not, on the basis of said vehicle movement data obtained by said obtaining means;

intermittence means for intermittently stopping said information providing means from providing said voice information for said vehicle driver when said judging means judges that the action of said vehicle is unstable.

13. An apparatus as set forth in claim 12, in which said information providing means comprises a radio set for receiving radio waves from broadcast stations to provide the voice information for said vehicle driver.

* * * * *